US 8,209,342 B2

(12) United States Patent
Srivastava et al.

(10) Patent No.: US 8,209,342 B2
(45) Date of Patent: Jun. 26, 2012

(54) SYSTEMS AND ASSOCIATED COMPUTER PROGRAM PRODUCTS THAT DISGUISE PARTITIONED DATA STRUCTURES USING TRANSFORMATIONS HAVING TARGETED DISTRIBUTIONS

(75) Inventors: Divesh Srivastava, Summit, NJ (US); Nikolaos Koudas, Ontario (CA); Ting Yu, Cary, NC (US); Qing Zhang, Torrance, CA (US)

(73) Assignee: AT&T Intellectual Property I, LP, Reno, NV (US)

( * ) Notice: Subject to any disclaimer, the term of this patent is extended or adjusted under 35 U.S.C. 154(b) by 811 days.

(21) Appl. No.: 12/262,706

(22) Filed: Oct. 31, 2008

(65) Prior Publication Data
US 2010/0114840 A1   May 6, 2010

(51) Int. Cl.
 *G06F 17/30* (2006.01)
(52) U.S. Cl. ...................................... 707/757
(58) Field of Classification Search ................... 707/757
See application file for complete search history.

(56) References Cited

U.S. PATENT DOCUMENTS

| | | | |
|---|---|---|---|
| 2002/0169793 A1* | 11/2002 | Sweeney ................... | 707/204 |
| 2007/0076728 A1* | 4/2007 | Rieger et al. ............... | 370/401 |
| 2008/0082566 A1* | 4/2008 | Aggarwal et al. .......... | 707/102 |

OTHER PUBLICATIONS

Robert McCaa, Steven Ruggles, Matt Sobek, Disseminating Anonymized Census Microdata via the Intenet: the IPUMS-International Project, 20th Population Census Conference, Ulaanbaatar, Mongolia, Jun. 19-21, 2002.*
Ruth Brand, Microdata Protection through Noise Addition, Inference Control in Statistical Databases, Lecture Notes in Computer Science, 2002, Springer.*
Huang et al., "Deriving Private Information from Randomized Data", *Proceedings of the 2005 ACM SIGMOD International Conference on Management of Data*, Baltimore, MD, Jun. 14-16, 2005, pp. 37-48.
Kargupta et al., "On the Privacy Preserving Properties of Random Data Perturbation Techniques" *Proceedings of the IEEE International Conference on Data Mining*, Melbourne Florida, Nov. 2003, pp. 99-106.
LeFevre et al., "Incognito: Efficient Full-Domain K-Anonymity", *Proceedings of the 2005 ACM SIGMOD International Conference on Management of Data*, Baltimore, MD, Jun. 14-16, 2005, pp. 49-60.
Li et al., "$t$-Closeness: Privacy Beyond $k$-Anonymity and $\ell$-Diversity", *IEEE International Conference on Data Engineering*, Istanbul, Turkey, 2007, pp. 106-115.
Machanavajjhala et al., "$\ell$-Diversity: Privacy beyond $k$-Anonymity", *IEEE International Conference on Data Engineering*, Atlanta, Georgia, 2006.
Samarati, "Protecting Respondents' Identities in Microdata Release", *IEEE Transactions on Knowledge and Data Engineering*, vol. 13, No. 6, Nov./Dec. 2001, pp. 1010-1027.

(Continued)

*Primary Examiner* — Cheryl Lewis
*Assistant Examiner* — Nan Hutton
(74) *Attorney, Agent, or Firm* — Myers Bigel Sibley & Sajovec, P.A.

(57) ABSTRACT

A data structure that includes at least one partition containing non-confidential quasi-identifier microdata and at least one other partition containing confidential microdata is formed. The partitioned confidential microdata is disguised by transforming the confidential microdata to conform to a target distribution. The disguised confidential microdata and the quasi-identifier microdata are combined to generate a disguised data structure. The disguised data structure is used to carry out statistical analysis and to respond to a statistical query is directed to the use of confidential microdata. In this manner, the privacy of the confidential microdata is preserved.

15 Claims, 13 Drawing Sheets

OTHER PUBLICATIONS

Sweeney, "Guaranteeing Anonymity when Sharing Medical Data, the Datafly System", *Proc. AMIA Annual Fall Symposium*, 1997, pp. 51-55.

Sweeney, "Achieving *k*-Anonymity Privacy Protection Using Generalization and Suppression", *International Journal on Uncertainty, Fuzziness and Knowledge-Based Systems*, vol. 10, No. 5, 2002, pp. 571-588.

Sweeney "*k* Anonymity: A Model for Protecting Privacy", *International Journal on Uncertainty, Fuzziness and Knowledge-Based Systems*, vol. 10, No. 5, 2002, pp. 557-570.

Xiao et al., "Anatomy: Simple and Effective Privacy Preservation", *Proceedings of the 32$^{nd}$ International Conference on Very Large Data Bases*, Seoul, Korea, Sep. 12-15, 2006, pp. 139-150.

Xiao et al., "Personalized Privacy Preservation", *Proceedings of the 2006 ACM SIGMOD International Conference on Management of Data*, Chicago, Illinois, 2006, pp. 229-240.

Zhang et al., "Aggregate Query Answer on Anonymized Tables", *IEEE 23$^{rd}$ International Conference on Data Engineering*, Istanbul, Turkey, Apr. 15-20, 2007, pp. 116-125.

* cited by examiner

Figure 3

| | ID | Quasi-identifiers | | Sensitive |
|---|---|---|---|---|
| tuple ID | name | zipcode | gender | salary |
| 1 | Alice | 91110 | F | $30K |
| 2 | Bob | 91110 | M | $40K |
| 3 | Carol | 91110 | M | $50K |
| 4 | Debra | 91130 | F | $60K |
| 5 | Elaine | 91210 | F | $40K |
| 6 | Grace | 91220 | F | $30K |
| 7 | Helen | 91240 | F | $50K |
| 8 | Jason | 91310 | M | $40K |
| 9 | Kyle | 91320 | M | $60K |
| 10 | Leo | 91330 | M | $60K |
| 11 | Nancy | 91340 | F | $60K |

Figure 4

| | | Quasi-identifiers | | Sensitive |
|---|---|---|---|---|
| group ID | tuple ID | zipcode | gender | salary |
| 1 | 1 | 91110 | F | $40K |
| 1 | 2 | 91110 | M | $50K |
| 1 | 3 | 91110 | M | $30K |
| 1 | 4 | 91130 | F | $60K |
| 2 | 5 | 91210 | F | {$30K, $40K, $50K, $60K} |
| 2 | 6 | 91220 | F | {$30K, $40K} |
| 2 | 7 | 91240 | F | {$50K, $60K} |
| 3 | 8 | 91310 | M | {$30K, $40K, $50K, $60K} |
| 3 | 9 | 91320 | M | {$30K, $40K} |
| 3 | 10 | 91330 | M | {$30K, $40K, $50K, $60K} |
| 3 | 11 | 91340 | F | {$50K, $60k} |

Figure 6

| | | Quasi-identifiers | | Sensitive |
|---|---|---|---|---|
| group ID | tuple ID | zipcode | gender | salary |
| 2 | 5 | 91210 | F | {$30K} |
| 2 | 6 | 91220 | F | {$40K} |
| 2 | 7 | 91220 | F | {$50K} {$60K} |

Algorithm 1 MinSumOfRange($g, H, m$): optimal generalization for the minimum sum of range problem

---

Let $D$ be the root of $H$
Let $D_1,...,D_k$ be the children of the root
Let $W = (w_1,...,w_k)$ be the weights of $D_1,...,D_k$ in $H$
Let $N = (|g_{D_1}|,...,|g_{D_k}|)$
Compute $(n_1,...,n_k)$, the maximum $m$-bound allocation of $N$ subject to $W$
Output $m - \sum_{i=1,...,k} n_i$ copies of D to the final generalization $G$
for each subtree $H_i$ rooted at $D_i$ do
    if $n_i > 0$ then
        MinSumOfRange $(g, H_i, n_i)$
    end if
end for

Algorithm 2 minSORFake($g, k, r, H$): the minimum sum of ranges of generalization when allowing fake values

---

Let $D$ be the root of $H$
Let $D_1$ and $D_2$ be the left and right children of the root
if minSOREFake $(g, k, r, H)$ calculated before then
    return the calculated result
end if
if $H$ is a leaf node then
    return 0
end if
$min$=inf;
for $x=0$ to $k$ do
    let $a : b$ be the ratio between left and right children of the root
    $sizeL=|g_{D_1}|+x$
    $sizeR=|g_{D_2}|+k-x$
    let $(u, v)$ be the maximum pair such that $u : v = a : b$,
    $u \leq |g_{D_1}| + x$, $v \leq |g_{D_2}| + k - x$, and $|g| + k - (u+v) \geq r$
    $r_1 = |g_{D_1}| = x - u$
    $r_2 = |g_{D_2}| + k - x - v$
    $tmp$ = minSORFake $(g_{D_1}, x, r_1, H_{D_1})$ + minSORFake$(g_{D_2}, k - x, r_2, H_{D_2}) + (|g| - u - v - r) * Range(D)$
    if $tmp < min$ then
        $min = tmp$
    end if
end for
return $min$

SYSTEMS AND ASSOCIATED COMPUTER PROGRAM PRODUCTS THAT DISGUISE PARTITIONED DATA STRUCTURES USING TRANSFORMATIONS HAVING TARGETED DISTRIBUTIONS

BACKGROUND OF THE INVENTION

The present invention relates to computer databases and, more particularly, to database modules and computer program products that disguise data structures in computer databases.

Cooperation among enterprises and governmental agencies often requires the sharing of private (confidential) microdata to support flexible and ad hoc aggregate analyses, and which may provide significant advantages over the use of pre-computed aggregates. Due to privacy concerns, microdata may need to be transformed to prevent discovery of any individual's sensitive attribute values. Some privacy models and techniques have been proposed to disguise microdata.

The approaches proposed thus far do model an attacker's background knowledge, which directly affects what can be inferred about individuals from the published microdata. Accordingly, these approaches can be subject to privacy breaches when attackers exploit public knowledge such as the correlation between quasi-identifiers and sensitive attributes.

SUMMARY

Various embodiments are directed to transforming confidential data to, for example, protect the privacy of individuals. According to some embodiments, a computer program product includes a computer readable medium having computer readable program code embodied therein. The computer readable program code includes computer readable program code configured to form a data structure that includes at least one partition containing non-confidential quasi-identifier microdata and at least one other partition containing confidential microdata. Computer readable program code disguises the partitioned confidential microdata by transforming the confidential microdata to conform to a target distribution, and combines the disguised confidential microdata and the quasi-identifier microdata to generate a disguised data structure. Further computer readable program code uses the disguised data structure to carry out statistical analysis and to respond to a statistical query, which is directed to the use of confidential microdata, so as to preserve the privacy of the confidential microdata.

Various other embodiments are directed to a system that carries out related operations to preserve the privacy of confidential microdata.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which:

FIG. 3 illustrates an example employee record table;

FIG. 4 shows an exemplary anonymized microdata table after the privacy controller applies distribution-based anonymization in accordance with some embodiments;

FIG. 6 illustrates a quasi-identifier table and a sensitive attribute table that may be formed by the privacy controller in accordance with some embodiments;

FIG. 7 illustrates pseudo-computer program code that may be carried out by the privacy controller to determine a desired generalization of confidential microdata in accordance with some embodiments;

FIG. 8 illustrates other pseudo-computer program code that may be carried out by the privacy controller to determine a desired generalization of confidential microdata in accordance with some embodiments;

DETAILED DESCRIPTION OF EMBODIMENTS

Figure 1:
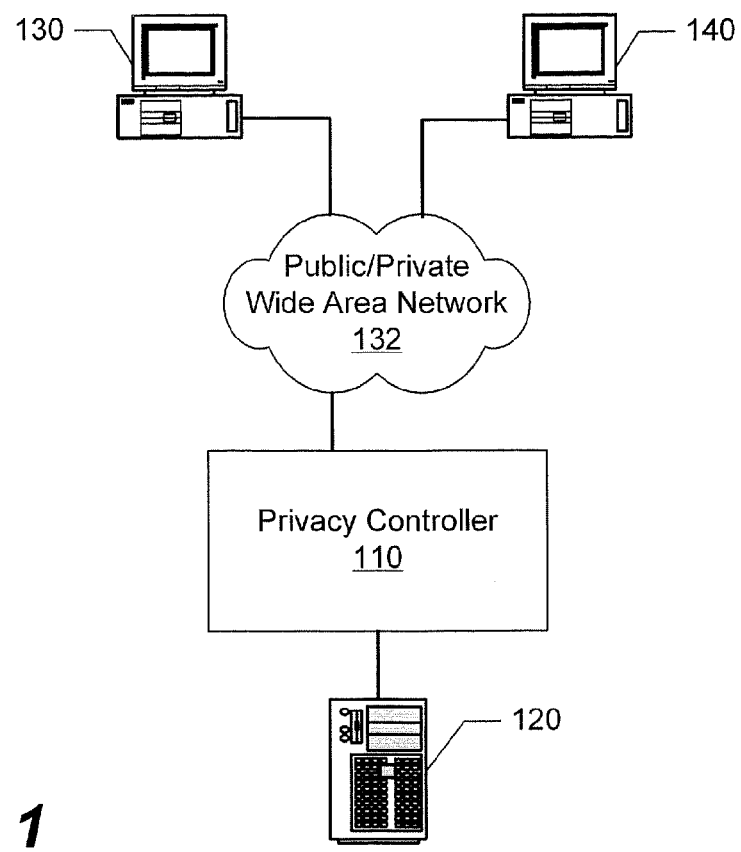
FIG. 1 is a block diagram of a data processing system that includes a privacy controller that is coupled to a computer searchable database and configured in accordance with some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Some embodiments may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, as will be described below, various embodiments may take the form of a computer program product on a computer-usable or computer-readable storage medium having computer-usable or computer-readable program code embodied in the medium for use by or in connection with an instruction execution system.

Some embodiments may arise from a recognition that before microdata can be shared to support ad hoc aggregate analyses, the microdata may need to be anonymized to protect the privacy of individuals. In accordance with some embodiments, a data privacy controller is configured to carry out a privacy protection model in which an attacker's background knowledge is flexibly modeled as distributions over portions of the domain. One goal of such privacy protection may be to attempt to ensure that an attacker cannot learn anything more from the anonymized microdata. The privacy controller can combine the use of sensitive attribute permutation and generalization with the addition of fake sensitive attribute values from the domain. Various metrics that are related to the accuracy of the aggregate query answers over the transformed data sheet and which may be obtained by the privacy controller are described below. Efficient anonymization algorithms that may be carried out by the privacy controller to optimize these accuracy metrics are also described.

FIG. 1 is a block diagram of a data processing system that includes a privacy controller 110 that is coupled to a computer searchable hardware database 120. The hardware database 120 stores various data structures in which microdata is partition into sets, and the sets and/or individual microdata can be associated with one another through defined relationships. The privacy controller 110 can be configured to use one or more privacy protection algorithms and/or methods described herein to anonymize data structures to protect the privacy of the associated data in accordance with various embodiments.

The privacy controller 110 and the database 120 can be connected to a public/private wide area network 132 (e.g., Internet) to enable the microdata in the database 120 to be shared with various computers 130 and 132. The privacy controller 110 can transform confidential microdata in the database 120 (e.g., transforming a separate copy or the original microdata) to attempt to protect the privacy thereof.

In some embodiments, the privacy controller 110 transforms the confidential microdata to create a separate anonymized database of disguised microdata and/or data structures. Statistical (e.g., aggregate) queries from the computers 130 and 140 that are directed to confidential microdata in the database 120, can instead be directed by the privacy controller 10 and/or the database 120 to the disguised microdata. The privacy controller 110 and/or the database 120 can then carry out the queried statistical operations on the disguised microdata to generate a response message that is returned to the querying computer In some other embodiments, the privacy controller 110 may respond to a statistical query from one of the computers 130 and 140 that is directed to a portion of the confidential microdata in the database 120 by transforming that portion to form disguised microdata, and to carry out the queried statistical operations on the disguised microdata to generate a response message that is returned to the querying computer.

Although the privacy controller 110 has been shown in FIG. 1 as being separate from the database 120 for ease of illustration and explanation, it is not limited thereto. Instead, some or all of their functionality may be combined within a common device such as within a database that carries out operations of a privacy controller according to at least one embodiment described herein.

The appended diagrams illustrate exemplary architecture, functionality, and operations of embodiments of methods, systems, and/or computer program products for operating a privacy controller 110 that anonymizes the microdata to protect the privacy of that data. In this regard, each block represents a module, segment, or portion of code, which comprises one or more executable computer program instructions and/or hardware operations for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

These computer program instructions may be executed by a processor of a general purpose computer, a special purpose computer, or other programmable data processing apparatus to produce a machine that carries out at least some of the functionality described herein with regard to various embodiments of the present invention. These computer program instructions may also be stored in a computer-usable or computer-readable medium that may direct a computer or other programmable data processing apparatus to function in a particular manner, such that the instructions stored in the computer-usable or computer-readable medium produce an article of manufacture including instructions that implement the function specified in the flowchart and/or block diagram block or blocks.

The computer-usable or computer-readable medium may be, for example but not limited to, an electronic, magnetic, optical, electromagnetic, or semiconductor system, apparatus, or device configured to at least temporarily store data. More specific examples (a nonexhaustive list) of the computer-readable medium would include the following: a magnetic memory (e.g., disk drive/diskette), a random access memory (RAM), a read-only memory (ROM), an erasable programmable read-only memory (EPROM or Flash memory), and a compact disc/digital video disk read-only memory (CD/DVD-ROM).

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 2:
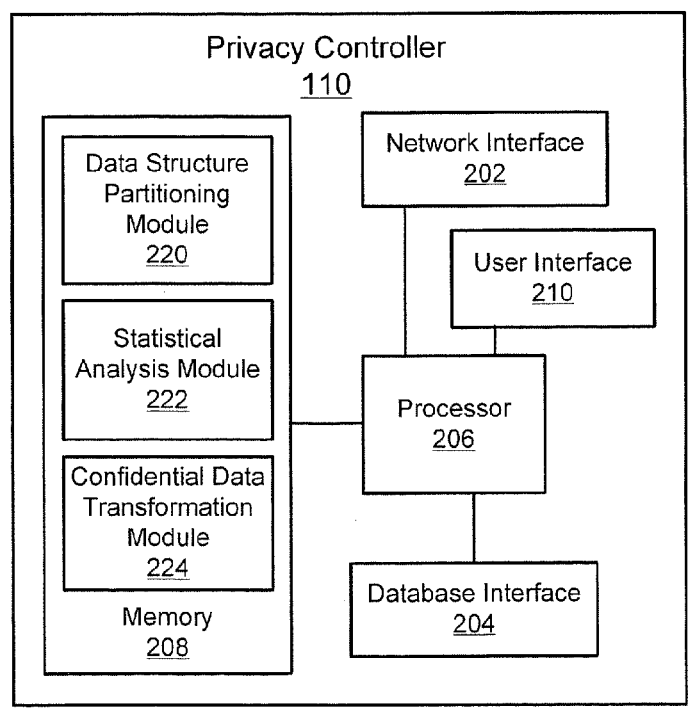
FIG. 2 is a block diagram that illustrates further exemplary details of the privacy controller of FIG. 1 in accordance with some embodiments.

FIG. 2 is a block diagram that illustrates further exemplary details of the privacy controller 110 of FIG. 1 in accordance with some embodiments. Referring to FIG. 2, the privacy controller 110 may include a network interface 202 (e.g., wireless and/or wireline interface, such as an Internet, wireless local area network, and/or cellular communication interface), a database interface 204 (e.g. backplane, point-to-point data interface, and/or network interface), a processor 206, and a memory 208.

According to one embodiment, the memory 208 may be an exemplary computer-readable medium that represents an overall hierarchy of memory devices containing the computer readable program code and data that is executed by the processor 206 to implement at least some of the functionality and processes performed by the privacy controller 110 described herein. Various computer readable program code module may be included within the memory 208 to carry out such functionality and perform such processes will be described below with regard to FIGS. 20 and 21.

The privacy controller 110 may further include a user interface 210 (e.g., keyboard, display, scanner, touch screen interface) that may enable an operator having sufficient administrative privileges to define partition levels of confidentiality/non confidentiality of microdata in the database 120 and to define parameters that control the transformation functionality of the privacy controller 110. The user interface 210 may also enable other operators having non-administrative privileges to carryout database queries, which may be handled in a similar manner to queries that are generated by the computers 130 and 140 in order to maintain the privacy of the microdata in database 120.

I. INTRODUCTION

According to some embodiments, the privacy controller 110 uses a privacy model that explicitly and flexibly captures the background knowledge of attackers, modeled as arbitrary distributions over portions of micro-data (called a background distribution). As an example, the distributions of the sensitive attributes (e.g., symptoms and prescriptions) of the general population of patients in the Los Angeles area may be public information known by attackers. On the other hand, a hospital in Beverly Hills may often treat celebrities. Since reporters often keep monitoring which celebrities checked into the hospital, the hospital may want to make sure that its published microdata does not provide attackers any more information about particular patients than the public background distribution.

Distribution-based modeling of public background knowledge, which may be used by the privacy controller 110, can flexibly represent both positive and negative correlations between quasi-identifiers and sensitive attributes. Background distributions can also be much more fine-grained. For example, the privacy controller 110 may use several distributions, each of which corresponds to the public knowledge of sensitive attributes of portions of data with different quasi-identifiers (e.g., among patients of different age groups). The privacy controller 110 may thereby use microdata anonymization to attempt to ensure that attackers cannot learn more about any individual's sensitive attribute values than the public background distributions.

In addition to privacy protection, the privacy controller 110 attempts to maintain as much useful information as possible in the published microdata. In particular, the privacy controller 110 attempts to maintain sufficient information to answer ad hoc aggregate queries with at least a threshold accuracy. Otherwise, the ad hoc aggregate queries may have insufficient accuracy to justify such data sharing. For instance, one approach, which may be used by the privacy controller 110, is to replace each record's sensitive attribute value with one that is randomly generated following the background distribution. However, this approach is not ideal as it changes the original data completely, and may negatively impact the accuracy of ad hoc query answering.

Thus, according to some embodiments, the privacy controller 110 uses an algorithm for distribution-based microdata anonymization that returns accurate bounds as answers to ad hoc aggregate queries. In particular, the privacy controller 110 can generate a generic framework for microdata protection that accommodates multiple background distributions associated with different portions of microdata. The privacy controller 110 can combine sensitive attribute generalization and permutation to transform microdata such that individual records appear to follow the background distributions.

According to some other embodiments, the privacy controller 110 uses an algorithm that identifies metrics related to accuracy of query answers over the transformed microdata, and algorithms that optimize these metrics. The less generalization is performed by the privacy controller 110 on sensitive attributes, the more accurate query results that may be obtained. The privacy controller 110 can therefore use efficient algorithms to minimize the sum of ranges of sensitive attribute generalization.

According to some other embodiments, the privacy controller 110 uses an algorithm for accurately answering aggregate queries which adds fake sensitive attribute values into the original data set before performing sensitive attribute generalization and permutation. The use of fake values may add significant challenges to the anonymization process. However, the privacy controller 110 can use an efficient algorithm to compute the optimal fake values that minimize our proposed metrics.

Various advantages that may be obtainable by the exemplary algorithms of the privacy controller 110 are described below with regard to both real and synthetic data sets. The experimental results show that microdata protected through sensitive attribute generalization and permutation combined with the use of fake sensitive attribute values can answer ad hoc queries with reasonable accuracy.

II. EXEMPLARY DISTRIBUTION-BASED ANONYMIZATION OF EMPLOYEE RECORDS

FIG. 3 shows an example employee record table of an IT company. Before this table is shared for business analysis, the explicit identifier attribute Name should be removed. Attributes Zipcode and Gender are quasi-identifiers and Salary is the sensitive attribute. For simplicity, we assume the domain of Salary to be {30K, 40K, 50K, 60K}.

Consider an attacker who knows that his neighbor Nancy is working for the company. Even if the privacy controller 110 removes attribute Name and only keeps the first three digits of Zipcode, he can still figure out that Nancy's salary is likely to be $60K (as most people with zipcode 913** have salary $60K). Whether this is a violation of privacy however depends on the public background knowledge available to the attacker. If it is publicly known that most IT people in the area are paid $60K, the published microdata really does not provide more knowledge than what the attacker already knows. On the other hand, if it is public that salary distribution in this area among IT professionals is uniform, then the attacker will gain much information about Nancy's salary, which should be considered as a privacy breach.

According to some embodiments, the privacy controller 110 is configured to respond to given background distributions of sensitive attribute values for different portions of microdata by anonymizing the microdata so that no information of individuals other than the background distributions can be discovered from the published microdata. Such anonymizing of microdata is referred to herein as "the distribution-based anonymization problem." In one exemplary approach, the quasi-identifiers remain unchanged while the sensitive attribute values (see section III) are generalized and permuted.

Figure 5:
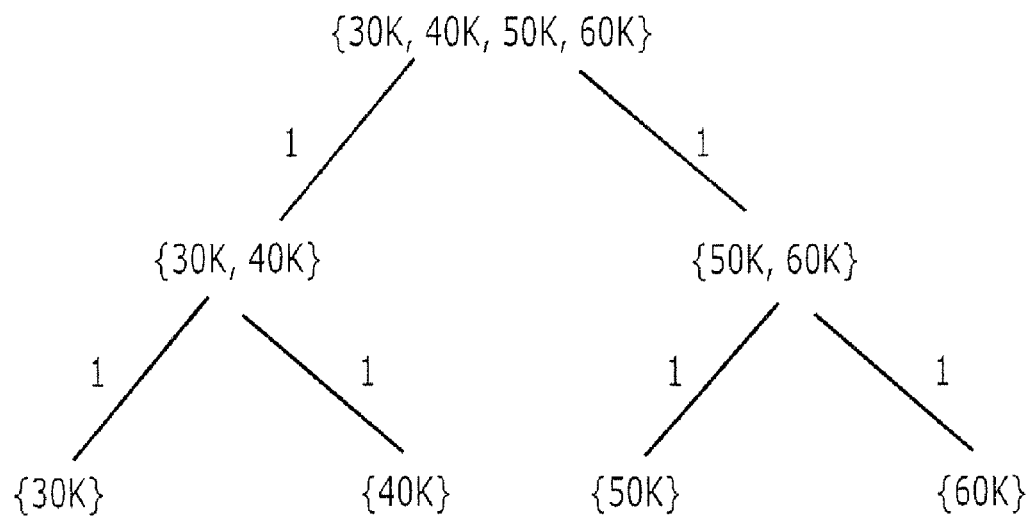
FIG. 5 illustrates a generalization hierarchy that may be implemented by the privacy controller in accordance with some embodiments.

FIG. 4 shows one possible anonymized microdata table after the privacy controller 110 applies distribution-based anonymization. In this example, the privacy controller 110 partitions the table according to the first three digits of the zipcode attribute. For purposes of explanation only, it is assumed that the background distributions for all the groups are the uniform distribution over {30K, 40K, 50K, 50K}. FIG. 5 shows the generalization hierarchy. As will be described below in Section 111-A, any background distribution can be specified over the domain generalization hierarchy by giving different weights to the children of the nodes in the hierarchy tree. The weight assignments in FIG. 5 correspond to a uniform distribution.

Once a group of tuples and the corresponding background distribution are determined by the privacy controller 110, each tuple's sensitive attribute is generalized to a subdomain corresponding to a node in the domain hierarchy. Then the generalized domains of the tuples in the same group are permuted by the privacy controller 110. For example, in group I of FIG. 4, each tuple's sensitive attribute is generalized to itself. These values are then permuted among group 1. In group 2, the three sensitive attribute values 30K, 40K and 50K are generalized to {30K, 40K}, {30K, 40K, 50K, 60K} and {50K, 60K} respectively. Then again the privacy controller 110 performs a random permutation of the generalized sensitive attributes among group 2. The combination of generalization and permutation guarantees that even if an attacker can associate a tuple with a unique individual through its quasi-identifiers, he can only infer that a tuple's sensitive attribute follows the background distribution but nothing more.

Since sensitive attributes are generalized and permuted, we usually cannot get exact answers to aggregate queries. But we can always derive a correct bound for a query from the anonymized table. For example, consider the following query: What is the average salary of female employees?

As the scheme used by the privacy controller 110 does not change the quasi-identifiers of each tuple, we know exactly how many tuples in each group are selected by the query, i.e., 2 tuples from group 1, 3 tuples from group 2, and I tuple from group 3. Since sensitive attributes are generalized and permuted, we do not know these tuples' original salaries. But we can derive the lower and upper bounds of the query result. Specifically, from group 1, the minimum and the maximum of the sum of the two tuples' salaries are 30K+40K=70K and 50K+60K=110K, respectively. For group 2, consider the generalized value {30K, 40K}. Since we do not know its original value, we have to estimate conservatively to make sure that the derived bounds are correct. Thus, the minimum and the maximum of the sum of the three tuples in group 2 would be 30K+30K+50K=110K and 40K+60K+60K=160K respectively. And bounds for the tuple from group 3 would be [30K, 60K]. Overall, the bounds for the answer of the query would be [35K, 55K].

Given a group of sensitive attribute values, there are many ways to generalize them to protect privacy. An extreme example is to generalize the sensitive attribute of each tuple to the whole domain. Though it offers the same privacy protection, the accuracy of query answering from these different schemes may vary greatly. We can verify that the bounds derived from the trivial generalization table are much worse than that from the table in FIG. 4.

Intuitively, the less generalization performed by the privacy controller 110, the better bounds that may be obtained. Based on this observation, in Section IV, optimization metrics and design algorithms are identified for use by the privacy controller 110 which may produce sensitive attribute generalization and permutation schemes that offer better query answering accuracy.

A second important technique that may be carried out by the privacy controller 110 to improve the accuracy of query answering is to introduce fake sensitive attribute values along with sensitive attribute generalization and permutation. To show the benefit of this technique, let us have a closer look at group 2 in FIG. 4. With only generalization and permutation, the generalization shown in FIG. 4 is the best we can do to minimize the sum of ranges of generalization. If we ask what is the average salary of employees in area with zipcode 912**, the best bound we can get is [110K/3,160K/3].

Instead, if the privacy controller 110 introduces another sensitive attribute value 60K into the group (we call it a fake value as it does not appear in the original data set), the resulting distribution will be exactly the same as the background distribution. Thus, we only need to perform a permutation without any generalization. Group 2 will then be as shown in the table of FIG. 6.

Referring to FIG. 6, three employees in this group are listed along with four possible salaries, meaning that their salaries can be any three out of the four. The values of the table of FIG. 6 can be formed by the privacy controller 110 by separately creating a quasi-identifier table and a sensitive attribute table, which can be joined through the group ID. We can verify that from the table of FIG. 6 that a person can still only infer that the possible salary of each employee is uniformly distributed between 30K and 60K, but nothing more. Meanwhile, since the privacy controller 110 reduced the generalization of sensitive attributes dramatically, the average salary of employees in that area can be more accurately bounded to be [40K, 50K].

Meanwhile, fake values also introduce uncertainty into the original data set. Without any restriction, given any data set, the privacy controller 110 can protect privacy without using any generalization. But this may not be the best choice for accurate aggregate query answering. For example, in group 3 of FIG. 4, the privacy controller 110 can add the following fake values: three 30K, two 40K and three 50K. Clearly, this may result in much worse bounds for aggregate queries. For example, the only bounds we can get for the average salary for group 3 would be [130K/4, 230K/4], which is worse than [140K/4, 220K/4], the bound when only applying generalization and permutation. Thus, the privacy controller 110 may minimize the sum of ranges of generalizations while limiting the number of added fake values. In Section V, an efficient algorithm is described that may be used by the privacy controller 110 to carry out such actions.

III. A FRAMEWORK FOR DISTRIBUTION-BASED ANONYMIZATION

A. Concepts and Notations

The privacy controller 110 can use an exemplary schema in which a de-identified microdata table includes two or more parts: a set of quasi-identifiers $\{QI, \ldots, Qk\}$, and a sensitive attribute S. This schema can be used to protect both numerical and categorical sensitive attributes. For purposes of the explanation only and without limitation on the scope of the present invention, various operations of the privacy controller 110 are described below in the context anonymizing numerical data to support aggregation operations, such as SUM and AVERAGE, and anonymizing categorical data to support a COUNT query. Moreover, for purposes of explanation only, it is assumed that the domain of S is finite.

Given the domain D of S, we say $D' \subset D$ is a subdomain of S if it covers a continuous segment of D. In other words, there exists no $t \in D(S)$ such that $t \notin D'$ but $\min(D') \leq t \leq \max(D')$. We thus also denote D' as [min(D'), max(D')], and call max (D')−min(D') the range of D.

A generalization hierarchy of S is a rooted tree H that satisfies the following conditions: (1) each node of H is a subdomain of D; (2) D is the root node; (3) all the children of a node N form a partition of N; and (4) a leaf node is a subdomain $\{t\}$, where $t \in D$.

As mentioned in section II, the owner of a microdata table specifies a partition $\{g_1, \ldots, g_n\}$ of the microdata table and a background distribution $P_i$ for each group $g_i$. Note that this is a very flexible model for microdata protection. In particular, it does not require the background distribution to be the same for all groups. For some group, $P_i$ may just be the same as its original distribution, while for some other group $P_j$ may be quite different from the original one.

For ease of explanation without limitation to the scope of the present invention, it its assumed that the data owner only specifies a background distribution for the whole microdata table. When there are multiple groups each with their own background distributions, the privacy controller 110 can use the exemplary techniques to accommodate the background distribution of each group separately.

From an anonymized microdata table T, if we can only derive that the distribution of the sensitive attribute of each tuple follows a distribution P, then we say T preserves privacy in terms of P, or is P-private for short. For example, the microdata table in FIG. 4 is U-private, where U is the uniform distribution over $\{30K, 40K, 50K, 60K\}$.

Given a background distribution P and a domain generalization hierarchy H for S, the privacy controller 110 assigns a weight to each edge of H such that for any two children $C_1$ and $C_2$ of a node N, we have weight$((N, C_1))$:weight $((N, C_2))$= $P(x \in C_1):P(x \in C_2)$. The resulting domain hierarchy is referred to herein as a privacy-annotated hierarchy. For simplicity, we assume all the weights are integers. The privacy-annotated hierarchy represents a distribution over D. For example, FIG. 5 is a privacy-annotated hierarchy that corresponds to a uniform distribution. In the following description below, unless otherwise noted, it is assumed that a background distribution is given as a privacy-annotated hierarchy.

B. Sensitive Attribute Generalization and Permutation

As explained above, some embodiments generalize the sensitive attribute value of each tuple to a subdomain of D. The privacy controller 110 then randomly permutates the resulting subdomains among all the tuples, so that the distribution of the possible value of a tuple's sensitive attribute t.S is the same as the background distribution. Note that the distribution of t.S depends on the given privacy-annotated hierarchy. For example, for a subdomain $\{30K, 40K\}$, given the privacy-annotated hierarchy in FIG. 4, we know that, if t.S $\in \{30K, 40K\}$, then t.S has an equal probability to be either 30K or 40K. On the other hand, suppose the ratio between the weights of 30K and 40K is 2:1 instead of 1:1 in the hierarchy (i.e., the hierarchy corresponds to a different background distribution). Then if t.S $\in \{30K, 40K\}$, then the probabilities of t.S to be 30K and 40K will be ⅔ and ⅓, respectively. Formally, we have the following definitions.

Definition 3.1: Let g be a multiset of elements in D and G be a multiset of subdomains of D. The term g is a multiset because multiple tuples may have the same sensitive attribute values. Similarly, G is a multiset since multiple elements in g may be generalized to the same subdomain. The term G is a generalization of g if there is a one-to-one mapping f from g to G such that $\forall s \in g, s \in f(s)$.

Definition 3.2: Let $G=\{D_1, \ldots, D_n\}$ be a generalization of g, and P be a background distribution over D. The term G is P-private generalization of g if for any element $t \in D$, $P(x=t)= 1/n\Sigma_{1 \leq i \leq n} P(x=t|x \in D_i)$.

Intuitively, if G is a P-private generalization of g, then from a random permutation of G the probability for any element in D to be in g follows P. Thus, G effectively hides the original distribution of values in g. From G, an attacker can only derive that elements in g follow P but nothing more.

For example, let U denote the uniform distribution over $\{30K, 40K, 50K, 60K\}$. Then both $\{\{30K\}, \{40K\}, \{50K-60K\}, \{50K-60K\}\}$ and $\{\{30K, 40K\}, \{30K, 40K\}, \{50K\}, \{60K\}\}$ are U-private generalizations of $\{30K, 40K, 50K, 60K\}$, and the latter is also a U-private generalization of $\{30K, 30K, 50K, 60K\}$.

A P-private generalization is performed by generalizing every sensitive attribute value to the whole domain D. Though secure, the resulting microdata table may not be sufficiently useful. Thus, it may be important to develop algorithms to produce generalizations which protect privacy, and further, can answer aggregate queries accurately. Before presenting such algorithms, an explanation is provided for how to answer aggregate queries over an anonymized microdata table.

C. Answering Aggregate Queries

Ad hoc data analysis in OLAP has been described with a focus on aggregate queries that select a subset of tuples based on arbitrary conditions on quasi-identifiers and then aggregate over the sensitive attribute, i.e., the aggregate queries are of the form "SELECT Aggr(S) FROM Microdata WHERE C", where C is a condition on quasi-identifiers, and Aggr may be common aggregates such as SUM, AVERAGE, MTN, etc.

Given an aggregate query, since quasi-identifiers are not changed during anonymization, from the anonymized table, we know exactly how many tuples in each group are selected by the query. Thus, from a P-private generalization of the group, the privacy controller 110 can estimate the lower and upper bounds of the aggregation inside each group. These bounds can then be combined together to form those for the whole table. In fact, to get the bounds for an aggregate query, what matters is only the number of selected tuples in each group. Therefore, the privacy controller 110 can pre-compute for each group the bounds of each type of aggregates when different numbers of tuples in that group are selected by a query, and store these bounds in an auxiliary table. When answering an aggregate query Q, after knowing the number of tuples selected by Q, the privacy controller 110 can look up the auxiliary table, and combine together the bounds of each group to get the bounds for Q. The privacy controller 110 may implement this process using SQL or another database search engine program. Therefore, there is no requirement to modify the DBMS's query engine to support aggregate queries over the anonymized table.

IV. OPTIMIZATION FOR ACCURATE QUERY ANSWERING

As described above, a P-private generalization where every sensitive attribute value is generalized to the whole domain, though secure, may not be sufficiently useful for answering aggregate queries. In this section, another embodiment is described that uses optimization criteria for distribution-based anonymization so that aggregate queries can be more accurately answered.

A. Minimize the Sum of Ranges of Sensitive Attribute Generalizations

The higher a subdomain is in the domain hierarchy, the more general it is, and thus the more "uncertainty" is introduced when answering queries. A natural measure of the uncertainty of a subdomain is its range, i.e., the difference between the maximum and the minimum elements in the subdomain. Formally, we define the following optimization problem.

Problem 4.1: Given a multiset g of sensitive attribute values, a privacy-annotated domain generalization hierarchy H that corresponds to a distribution P over D, find a P-private generalization G of g such that $\Sigma_{D' \in G} \text{range}(D')$ is minimized. We call G the optimal P-private generalization of g.

To facilitate our discussion, we introduce the following notations. Given a subdomain D' and a multiset g of sensitive attribute values, we denote $g_{D'}$ to be the multiset that contains all the elements in g that belong to D'. For example, suppose g={30K, 30K, 40K, 50K} and D'={30K, 40K}. Then $g_{D'}$={30K, 30K, 40K}.

Further, let N $(n_1, \ldots, n_k)$ be a sequence of integers, W=$(w_1, \ldots, w_k)$ be a sequence of weights, and m be an integer. We say $(n'_1, \ldots, n'_k)$, where $n'_i$ is an integer and $n'_i \leq n_i$ for i=1, ..., k, is an m bound allocation of N subject to W, if $n'_1:n'_2: \ldots :n'_k=w_1:w_2: \ldots :w_k$, and $\Sigma_{1 \leq i \leq k} n'_i \leq m$. We say $(n'_1, \ldots, n'_k)$ is a maximum m-bound allocation, if for any other m-bound allocation $(n''_1, \ldots, n''_k)$, $n''_i < n'_i$, i=1, ..., k.

With a slight abuse of notation, we assume that (0,0, ..., 0) is always an m-bound allocation that is subject to any sequence of weights W.

For example, suppose we have N=(3, 8, 6, 9), W=(1, 2, 2, 1) and m=15. Then (2, 4, 4, 2) is the maximum m-bound allocation of N subject to W. If m=5, then the only m-bound allocation of N subject to W is (0, 0, 0, 0).

To minimize the sum of ranges of generalization, it is preferable to generalize a sensitive attribute value to a more specific subdomain (i.e., one far away from the root in the privacy-annotated hierarchy). Meanwhile, to make the tuples in the group follow the background distribution, the number of sensitive values generalized to a certain level of subdomains should preserve the ratio between the weights of those subdomains in the privacy-annotated hierarchy. This explains the intuition behind maximum allocation as defined above.

Algorithm I shows the optimal algorithm to the above problem (with reference also to FIG. 7). The algorithm is essentially a greedy algorithm. It starts at the root node, and determines how many tuples have to be generalized to the root node. The idea is that it should push as many tuples as possible to the subtrees rooted at its children, as long as the distribution P is preserved (i.e., subject to the weights of its children). In detail, suppose there are n elements in g and the root node has k children $D_1, \ldots, D_k$ in the domain generalization hierarchy. The algorithm determines what is the maximum number of tuples that should be generalized to subdomains in the subtree rooted at each $D_i$, i=1, ..., k, subject to the background distribution P. The remaining tuples must be generalized to the root domain.

EXAMPLE 1

Here we use an example to show in detail how an exemplary embodiment of the algorithm may be carried out by the privacy controller 110. Consider the privacy-annotated hierarchy H in FIG. 5 and a multiset g of sensitive attribute values {30K, 30K, 40K, 40K, 50K, 60K}.

At the beginning, the algorithm sets m to |g|=6, and calls MinSumOfRange(g, H, m). For the two children of the root of H, we have $|g_{\{30K,40K\}}|=4$ and $|g_{\{50K,60K\}}|=2$. Since the ratio between the weights of {30K, 40K} and {50K, 60K} is 1:1 in H, we can at most have two subdomains in the subtree rooted at {30K, 40K} in the final P-private generalization. Otherwise, the background distribution cannot be preserved. In other words, the maximum m-bound allocation is (2, 2). And the algorithm outputs 6−2−2=2 generalized domain corresponding to the root, which is {30K, 40K, 50K, 60K}. This means that any P-private generalization should contain at least two root domains.

Next, the algorithm calls MinSumOfRange(g, $H_i$, 2), where $H_i$ is the subtree rooted at {30K, 40K} and {50K, 60K} respectively. For the left child, we have $g_{\{30K\}}=2$ and $g_{\{40K\}}=2$. The maximum 2-bound allocation of g would be (1, 1). Therefore, at this step, the algorithm does not output any generalized subdomain {30K, 40K} as 2−1−1=0. A similar process happens for the subtree rooted at {50K, 60K}.

The algorithm continues to the leaf node in the hierarchy. Finally, the optimal generalization of g would be {{30K}, {40K}, {50K}, {60K}, {30K, 40K, 50K, 60K}, {30K, 40K, 50K, 60K}}.

Note that as the algorithm continues to the children of a node by calling function MinSumOfRange, its passes to the subtree rooted at a child node the new bound m. But it still passes g, all the tuples in the group, to the function. In other words, in our algorithm, it is not necessary to decide which tuple's sensitive attribute value is generalized to which subdomain. This decision is not relevant because we will later permute all the generalized subdomains anyway. We only need to know what generalized subdomains we have in an optimal solution. This is the essential reason for the efficiency of the algorithm.

The algorithms can compute $|g_{D'}|$, for all subdomains D' bottom-up from all the leaf nodes. Therefore the complexity of this step is $O(|g|)$ assuming $|g|$ is greater than the number of subdomains in H. The above algorithm simply does a depth-first traversal of H, with complexity of $O(|H|)$. Thus the overall complexity is $O(|g|)$, i.e., linear to the size of the microdata.

Pseudocode for an exemplary embodiment of the above-described algorithm is shown in FIG. 7.

Theorem 1: The multiset of subdomains generated by the algorithm MinSumOfRange is a P-private generalization with the minimum sum of ranges of subdomains. The complexity of MinSumOfRange is linear to the size of the microdata.

B. Partitioning Quasi-Identifiers

Since a majority of aggregate queries involve range conditions, tuples with similar quasi-identifiers tend to be selected together. This observation suggests that, the privacy controller 110 may further partition the group specified by the microdata owner, and have tuples with similar quasi-identifiers together to improve query answering accuracy. In some embodiments, a group is first partitioned into multiple subgroups such that tuples in each subgroup have the same quasi-identifiers. Then for each subgroup the privacy controller 110 finds its optimal P-private generalization. The algorithm is referred to herein as the QI-SA algorithm. In contrast, the term SA-only is used herein to denote the approach that uses only the optimal sensitive attribute generalization to answer queries without further partitioning.

One potential advantage of QI-SA is that, given any aggregate query, either all or none of the tuples in a subgroup are selected by the query. On the other hand, even though the union of each subgroup's optimal P-private generalization is still a P-private generalization for the whole group, it may not be optimal. Thus in general we cannot claim that one approach always yields more accurate query answering than the other. Exemplary experiments providing a detailed comparison of the two approaches with different data sets are described further below.

V. INTEGRATING FAKE VALUES INTO THE FRAMEWORK

In some embodiments, the privacy controller 110 adds fake values as a way to further improve query answering accuracy. As shown in section II, adding fake values may reduce the level of generalization. However, if we do not limit the number of fake values, though the sum of ranges of generalizations can always be reduced to 0, it may not improve the bounds for queries. The sum of ranges of generalizations can serve as a reasonable heuristic only when we restrict the number of added fake values. The following optimization problem illustrates an exemplary approach that may be carried out by the privacy controller 110 to select a number of fake values that are to be added to the microdata.

Problem 5.1: Given a multiset g of sensitive attribute values, a privacy-annotated hierarchy H corresponding to a distribution P over D, and a threshold t, find a multiset f of no more than t fake values, such that MinSumOfRange($g \cup f$, H, $|g \cup f|$) (minSOR($g \cup f$, H) for short) is minimized.

It is assumed herein that H is a binary hierarchy. As described above, with appropriate privacy annotation, a binary hierarchy can represent any distribution P over a domain D.

EXAMPLE 2

Suppose g={1, 3, 5}, t=2, and H is the uniform distribution over {1, . . . , 8}. The optimal solution is for f to have only one fake value (either 7 or 8). We can verify that any f with two fake values is suboptimal. This example suggests that it is not sufficient to only examine set f that contains exactly t fake tuples.

It can be shown that there exists fake value set f which is locally optimal but suboptimal globally. By locally optimal, we mean that for any $f_1$ and $f_2$, where $|f_1|=|f|-1$ and $|f_2|=|f|+1$, we have minSOR($g \cup f_1$, H)>minSOR($g \cup f$, H) and minSOR($g \cup f_2$, H)>minSOR($g \cup f$, H).

EXAMPLE 3

Consider g={1, 3, 5, 7} and t=4. We can see that f={1, 5} is a locally optimal solution. The optimal generalization for $g \cup f$ is {[1-2], [3-4], [5-6], [7-8], [1-4], [5-8]}, whose sum of ranges is 10. For any $f_1$ with size 1, the optimal generalization for $g \cup f_1$ is {[1-2], [3-4], [5-6], [7-8], [1-8]}, whose sum of ranges is 11. Similarly, for any $f_2$ with size 3, the optimal generalization for $g \cup f_2$ is {[1-2], [3-4], [5-6], [7-8], [1-4], [5-8], [1-8]}1, whose sum of ranges is 17. Though f is locally optimal, it is not a globally optimal solution, which should be f={2, 4, 6, 8}, as minSOR($g \cup f$, H)=0.

The above example shows that problem 5.1 cannot be solved by sequentially scanning fake value sets from size 0 to size t and using local optimality as a stopping condition.

To further show the challenges in solving this problem, let us consider a simpler case. Suppose we only allow to add a single fake value, and the background distribution is uniform. Assume in g the number of values in the left subtree is one more than that in the right subtree. When adding a fake value, it may be thought that it is optimal to add a value belonging to the right subtree. By doing so the number of values in the two subtrees are balanced and thus closer to the background distribution. If this were true, the problem may be solved in a top-down manner.

Unfortunately, it turns out that adding fake values to the subtree with fewer values in g is not always the best choice.

EXAMPLE 4

Consider g={1, 1, 1, 2, 3, 4, 5, 6, 7, 9, 9, 11, 11, 13, 13, 15, 15}, where the domain D={1 . . . 16}. Here g has one more element in the subdomain [1-8] than in [9-16]. If we add a fake value to the right subtree, i.e., [9-16], then the optimal generalization would be three copies of [1-8], two copies of [9-10], [11-12], [13-14] and [15-16] respectively, and a single copy of [1-2], [3-4], [5-6], [7-8], [1-4], [5-8] and [9-16] respectively, whose sum of ranges is 46.

Instead, if we add 8 which belongs to the left subtree, the optimal generalization would be two copies of [1-16], [9-10], [11-12], [13-14] and [15-16] respectively, and a single copy of [1-1], [2-2], . . . , [8-8], whose sum of ranges is 38<46.

The above example shows that when determining where to put fake values, the privacy controller 110 can be configured to take the whole data set into consideration. Heuristics that only examine local properties (e.g., the balance of the subtrees at some level of the generalization hierarchy) would not yield optimal solutions.

Optimal Algorithm. An algorithm that may be carried out by the privacy controller 110 to address the problem 5.1 is described below and is illustrated by the corresponding pseudocode shown in FIG. 8. For simplicity, it is assumed that the background distribution represented by H is uniform. Let the two children of the root domain be $D_1$ and $D_2$. Suppose we want to find a set f of exactly k fake values, among which x comes from $D_1$ and k−x comes from $D_2$, such that min SOR(g ∪ f, H) is minimized. Once x is fixed, we would know exactly how many values should be generalized to the root domain and from which side. In detail, let $n=|g_{D1}|+x$ and $m=|g_{D2}|+k-x$ (which are the numbers of values in g ∪ f that belong to $D_1$ and $D_2$ respectively). If n≧m, then exactly n−m values should be generalized to the root domain, and they are all from $D_1$. Thus, to minimize minSOR(g ∪ f, H), we need to do the following. First, choose a set $f_2$ of k−x fake values, such that minSOR($g_{D2}$ ∪ $f_2$, $H_{D2}$) is minimized, where $H_{D2}$ is the hierarchy rooted at $D_2$. Second, choose a set $f_1$ of x fake values, and then choose f ⊂ $g_{D1}$ ∪ $f_1$, where |f′|=n−m, such that minSOR($g_{D1}$ ∪ f′, $H_{D1}$) is minimized. In other words, for the side of $D_1$, we need to insert x fake values and then remove n−m values so that the resulting data set offers the minimum sum of ranges of generalizations. Note that this is not the same as simply inserting x−(n−m) fake values, as the n−m removed values may come from both the inserted fake values and the original data set $g_{D1}$.

In general, if H is not uniform, for both subdomains the privacy controller 110 may need to insert some fake values and then remove several others. For example, suppose in H the ratio between $D_1$ and $D_2$ is 2:1. Originally $|g_{D1}|=10$ and $|g_{D2}|=7$. Now assume we want to add 3 fake values to each of $g_{D1}$ and $g_{D2}$. In this case, we need to have 5 values generalized to the root domain, 1 from those in $D_1$ and 4 from $D_2$. That means, for $g_{D1}$, we need to insert 3 fake values and then remove 1 value. And for $g_{D2}$, we should insert 3 fake values and then remove 4 values. Here we see that sometimes the number of removed values may be more than that of those inserted.

The above discussion shows that problem 5.1 bis in fact a special case of a more general problem: adding a set of k fake values to g and then removing r values, what is the minimum sum of ranges for the remaining data set after it is generalized and permuted to achieve P-privacy? We denote the problem as minSORFake(g, k, r, H). This explanation also suggests that this problem has the optimal substructure property, and is amenable to dynamic programming solutions. Specifically, let the ratio between $D_1$ and $D_2$ be a: b. Suppose among the k added fake values, x belongs to subdomain $D_1$ and k−x belongs to subdomain $D_2$. Clearly, to minimize the sum of ranges of generalizations, the fewer values generalized to the root domain, the better. Let (u, v) be the maximum pair such that $u \leq |g_{D1}|+x$, $v \leq |g_{D2}|+k-x$ and u:v=a:b. Therefore, among the |g|+k values, there should be at least |g|+k−(u+v) to be generalized to D.

Remember that we also need to remove r values. If r≦|g|+k−(u+v), we can simply take values out from those generalized to the root domain. Otherwise, we have to further take values from $g_{D1}$ and $g_{D2}$. Thus, in general, we should let (u, v) be the maximum pair such that u:v=a:b, $u \leq |g_{D1}|+x$, $v \leq |g_{D1}|+k-x$, and |g|+k−(u+v)≧r.

Once (u, v) is determined, we essentially break the solution to minSORFake(g, k, r, P) into three parts: (1) those values generalized to the root domain D; (2) those values generalized to the subdomains within the hierarchy rooted at $D_1$; and (3) those values generalized to the subdomains within the hierarchy rooted at $D_2$.

For the subdomain $D_1$ and $g_{D1}$, the privacy controller 110 can insert x fake values and then remove $r_1=|g_{D1}|+x-u$ values, i.e., it is the subproblem minSORFake($g_{D1}$, x, $r_1$, $H_{D1}$). Similarly, for the subdomain $D_2$, we have the subproblem minSORFake($g_{D2}$, x, $r_2$, $P_{D2}$), where $r_2=|g_{D2}|+(k-x)-v$.

In summary, we have $$\text{minSORFake}(g, k, r, P) = \Sigma 0 \leq x \leq k \,\text{minSORFake}(g_{D1}, x, r_1, P_{D1}) + \text{minSORFake}(g_{D2}, x, r_2, P_{D2}) + (|g|-u-v-r)\text{Range}(D)$$

where u, v, $r_1$ and $r_2$ are calculated as described above. Algorithm 2 (see also FIG. 8) shows the pseudocode for the optimal algorithm. For ease of explanation only, the algorithm is presented in the form of recursion, which can be easily converted to a standard dynamic programming algorithm.

To solve problem 5.1 completely, we have to invoke minSORFake(g, k, 0, H) for k=0, . . . , t in order to identify the optimal number of fake values to add. Another interesting observation is that, if we set k=0, i.e., we do not insert any fake values, then algorithm minSORFake is exactly the same as algorithm MinSumOfRange.

EXAMPLE 5

Let g={1,2,3,5,6,7,7} and V={1, 2, . . . , 8}. Assume H is a balanced binary tree that rep-resents the uniform distribution over D. Suppose we want to insert exactly 2 fake values into g, and thus invoke minSORFake(g, 2, 0, H). At the root level, we first let x=0 and k−x=2, i.e., all the fake values are from [5-8], and will have sizeL=3 and sizeR=6. Since now the right subtree has 3 more values than the left one, we have to extract 3 values from the right tree and generalize them to the root domain. This is exactly what the algorithm does, as we set u=v=3, $r_1$=0 and $r_2$=3, and invoke minSORFake($g_{[1-4]}$, 0, 0, $H_{[1-4]}$) and minSORFake($g_{[5-8]}$, 2, 3,$H_{[5-8]}$). Because we do not need to add or remove any values from $g_{[1-4]}$, minSORFake($g_{[1-4]}$, 0, 0, $H_{[1-4]}$) is the same as MinSumOfRange ($g_{[1-4]}$, $H_{[1-4]}$, $|g_{[1-4]}|$).

After minSORFake($g_{[5-8]}$, 2, 3, $H_{[5-8]}$) is invoked, we also first check the case x=0. As we need to eventually remove 3 values from the domain [5-8], we will have u=v=1, $r_1$=1 and $r_2$=3. Here we take a total of 4 values from the domains [5-6] and [7-8], among which 3 are removed (they are in fact those taken to the higher level to be generalized), and the remaining one is generalized to [5-8]. The algorithm will then continue to the next level of H.

From the example, we see that the algorithm does not need to generate specific fake values to add. Instead, it directly computes domain generalizations supposing optimal fake values are added.

Complexity Analysis. Suppose the hierarchy H is a balanced binary tree, and the domain of the sensitive attribute is D (i.e., the root domain of H). Observe that there are at most 2|D| nodes in H. For each node, the algorithm can be invoked with at most t+1 possible values of the number of fake values to be inserted in the node's subtree. And for each node and each possible number of fake values to insert in the node's subtree, there are at most |g|+t values for the number of values to remove from the subtree. Thus a natural but loose bound for the number of cells in the dynamic programming matrix is 2(t+1) (|g|+t)|D|. For each cell, the computation takes the minimum over t+1 possible cells, which gives the time bound as $O(t^2(|g|+t)|D|)$.

However, it is observed that, given g and H, even though the algorithm minSORFake has two additional parameters k and r, r is not a free parameter. From the pseudocode of FIG. 8 it is seen that, once the number of fake values for each subdomains of the root is fixed (i.e., x and k−x), r is also uniquely determined. Let d be the depth of a node D' in H (where the root's depth is 0). Then the number of possible choices of fake values to add is bounded by $(t+1)^d$, which, based on the above observation, also bounds the number of possible choices of values to remove from the subtree. Further, as the number of values to remove from a subtree cannot exceed the number of values in D', a tighter bound is given by $\min((t+1)^d; |g_{D'}|+t)$.

Summed over all the $2^d$ nodes in the same level as D', we get the bound for the number of values to remove from all nodes in that level as $\min((2t+2)^d; |g_{D'}|+t)$. Note that the first term is small close to the root of the tree and gets much larger than the second term close to the leaves of the tree, if D is reasonably large.

Summed over all levels (and hence all the nodes) in the tree, the sum of the second term is given by $|g|(1+\log|D|)+2t|D|$. Thus, even ignoring the first term in $\min((2t+2)^d; |g|+t2^d)$, this would yield a bound for the number of cells to be maintained in the dynamic programming matrix as $(t+1)(|g|(1+\log|D|)+2t|D|)$, which is much tighter than the bound $2(t+1)(|g|+t)|D|$ given above. Similarly, a much tighter bound for time complexity is given by $O(t^2(|g||\log\log|D|+2t|D|))$.

VI. EXPERIMENTS

The following exemplary experiments were conducted on the Adult Database from the U.C. Irvine Machine Learning Repository at the website: www.ics.uci.edu/mlearn/mlrepository.html. The database is obtained from the US Census data, and contains 14 attributes and over 48,000 tuples. The same eight attributes were chosen as quasi-identifiers in the experiments. Since the exemplary algorithm focuses on numerical-valued sensitive attributes, "capital loss" was selected as the sensitive attribute. In particular, we are interested in those people who do have capital loss. Therefore, the algorithm was used to remove those tuples whose capital loss attributes are 0 or NULL. That leaves us with 1427 tuples. The range of capital loss in these tuples is from 155 to 3900, with 89 distinct values.

Experiments were also conducted on synthetic data sets that use the same schema as the Adult Database. The database was populated with different numbers of tuples, assuming certain distribution of the capital loss attributes. We also consider the correlation between the capital loss attribute and quasi-identifiers. The details of the synthetic data sets are described further below during presentation of the experimental results. The experiments were designed to test the effectiveness of our approach. In the experiments, the accuracy of the bounds was derived from an anonymized microdata table. Specifically, let l and u be the lower and upper bounds of an aggregate query result r. We define error=(u−l)/r to be the relative error of the bounds. A smaller error indicates improved accuracy of the bounds.

Regarding the performance of anonymization through SA generalization, an analysis is performed on the accuracy of aggregate query answers of different query sizes when applying the SA-only algorithm and the QI-SA algorithm on both real and synthetic data sets. Regarding the impact of adding fake values, an analysis is performed on the impact of integrating different number of fake values with the QI-SA and SA-only schemes. Regarding the impact of the background distributions, an analysis is performed on the accuracy tradeoff when the data owner specifies different background distributions other than the actual distribution of the sensitive attributes in the original microdata. Regarding the enforcing different background distributions on different parts of the data, an analysis is performed on the effectiveness of our algorithm when we enforce different background distributions for different parts of the data. Unless otherwise specified, the domain generalization hierarchy used in these experiments is a balanced binary tree.

A. Performance of Anonymization Through Sensitive Attribute Generalization

The relative errors of various algorithms when applied on different data sets is described below. In all experiments in this section, the background distribution is set as the source distribution of sensitive attribute values in the overall microdata table. A sequence of queries have the form "select avg (capital_loss) from adult-table where age≧X and age≦Y", and vary the range [X, Y]. More specifically, given a range R, we randomly pick 100 pairs of X and Y from the domain of the age attribute such that Y−X=R. The average relative error of these 100 queries is reported.

Figure 9:
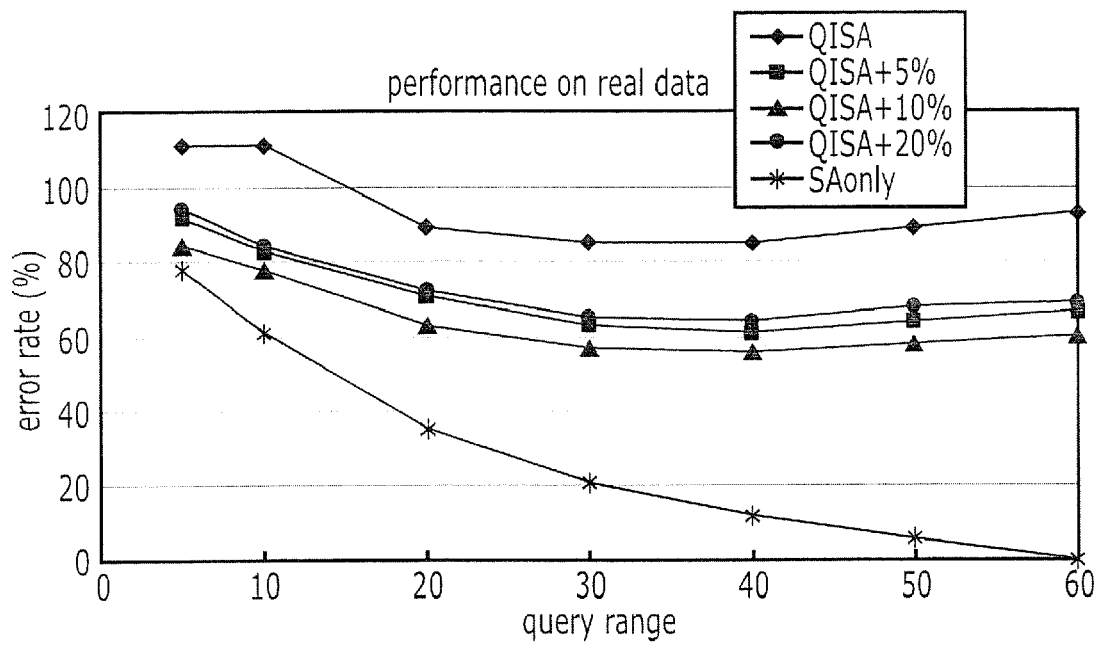
FIG. 9 illustrates graphs that show the dependency of error rate on query range which may be obtained when using SA-only and QI-SA processes.

FIG. 9 shows graphs that illustrate the experimental results when using SA-only and QI-SA respectively. With reference to FIG. 9, it is observed that as the total number of tuples selected increases, the relative error introduced by SA-only drops dramatically, while that introduced by QI-SA does not change much. This is because for SA-only, when the query range increases, the number of tuples touched in each group also increases, which results in a more accurate estimate. For QI-SA, each "age" value is by itself a group, and tuples in each group are either completely touched or not touched at all by a query. So the derived bounds do not change much when the query range changes.

Another observation is that when the query range is small, SA-only gives quite inaccurate bounds. The reason is that with small query range the selected tuples only count for a very small portion of each group, which results in bounds with poor accuracy. When the query range increases, as SA-only minimizes the sum of ranges across all generalized subdomains, it produces bounds with better accuracy than QI-SA.

Meanwhile, as QI-SA generates much more groups than SA-only, each group is of a much smaller size. Thus when using QI-SA, the sensitive attribute values in many groups are generalized to the root domain, because the distribution of each group with the same quasi-identifiers is often quite different from the overall background distribution. So even when the query range increases, the accuracy of the bounds does not improve.

To further validate this evaluation, QI-SA and SA-only are compared on two synthetic data sets, with different sensitive at-tribute distributions and correlations between quasi-identifiers and the sensitive attribute. In the first data set, there is no correlation between quasi-identifiers and the sensitive attribute. We randomly generate 10k tuples whose sensitive attribute values for each tuple follows a normal distribution. The only quasi-identifier "age" is randomly generated uniformly in the range [17, 79].

Figure 10:
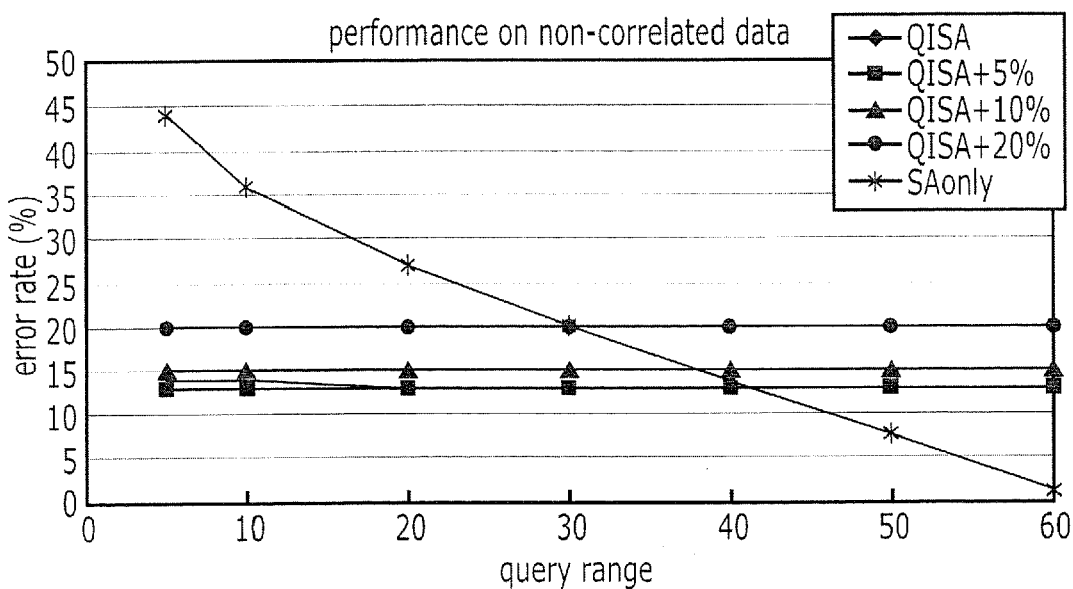
FIG. 10 illustrates graphs that show the dependency of error rate on query range which applying exemplary privacy functions to non-correlated microdata.

The experimental results are illustrated by the graphs shown in FIG. 10. Referring to FIG. 10, it is observed that for this data set QI-SA consistently produces accurate bounds. This is because the sensitive attribute values in each age group follow the overall distribution closely. Thus, only a few generalizations are needed to achieve the privacy goal. As the query range increases, more tuples are selected, and the relative errors of SA-only quickly drops. In particular, when most of the tuples are selected by a query, SA-only outperforms QI-SA, due to its emphasis on a global optimal subdomain generalization.

Intuitively, if there is a strong correlation between quasi-identifiers and the sensitive attribute, tuples in each age group generated by the QI-SA algorithm tend to have similar sensitive attribute values, which need to be generalized to higher subdomains to achieve the privacy goal. The next experiment is directed to investigating the impact of correlation on the accuracy of query answering. QI-SA and SA-only were compared when varying the correlation between quasi-identifiers and the sensitive attribute. In the second synthetic data set, we introduce a correlation between "age" and "capital loss". First, "age" is generated following a uniform distribution in the range [17, 79]. A positive correlation was assumed between "age" and "capital loss". For each tuple with age a, its capital loss was generated following a normal distribution with mean v. The higher one's age is, the larger v that was chosen. The size of the data set is also 10k.

Figure 11:
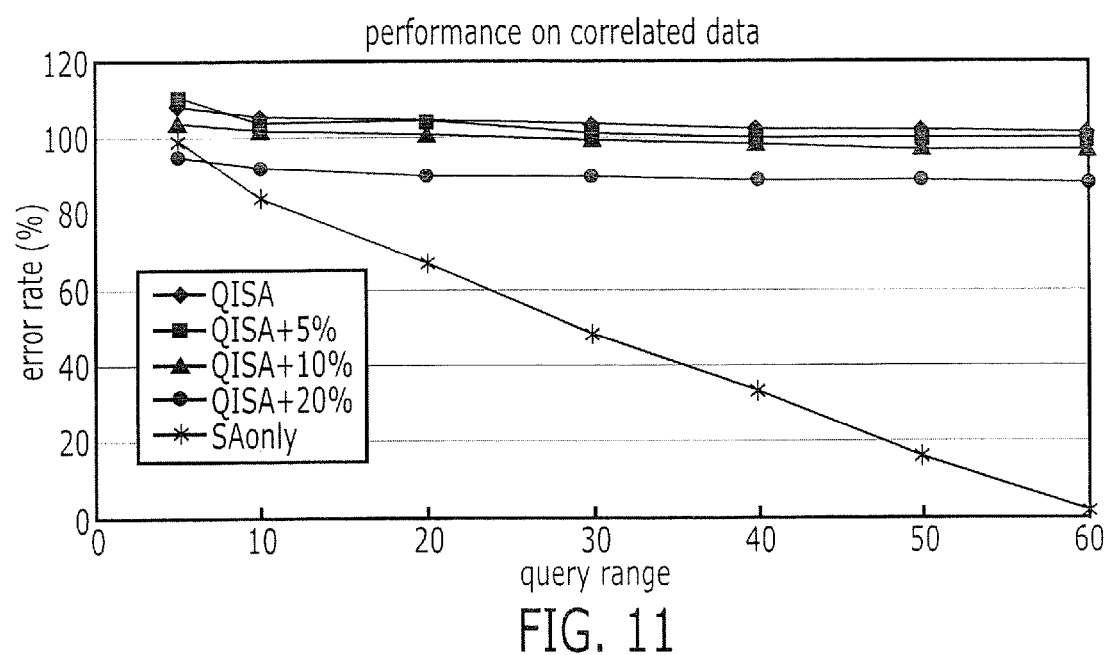
FIG. 11 illustrates graphs that show the dependency of error rate on query range when applying exemplary privacy functions to correlated microdata.
Figure 12:
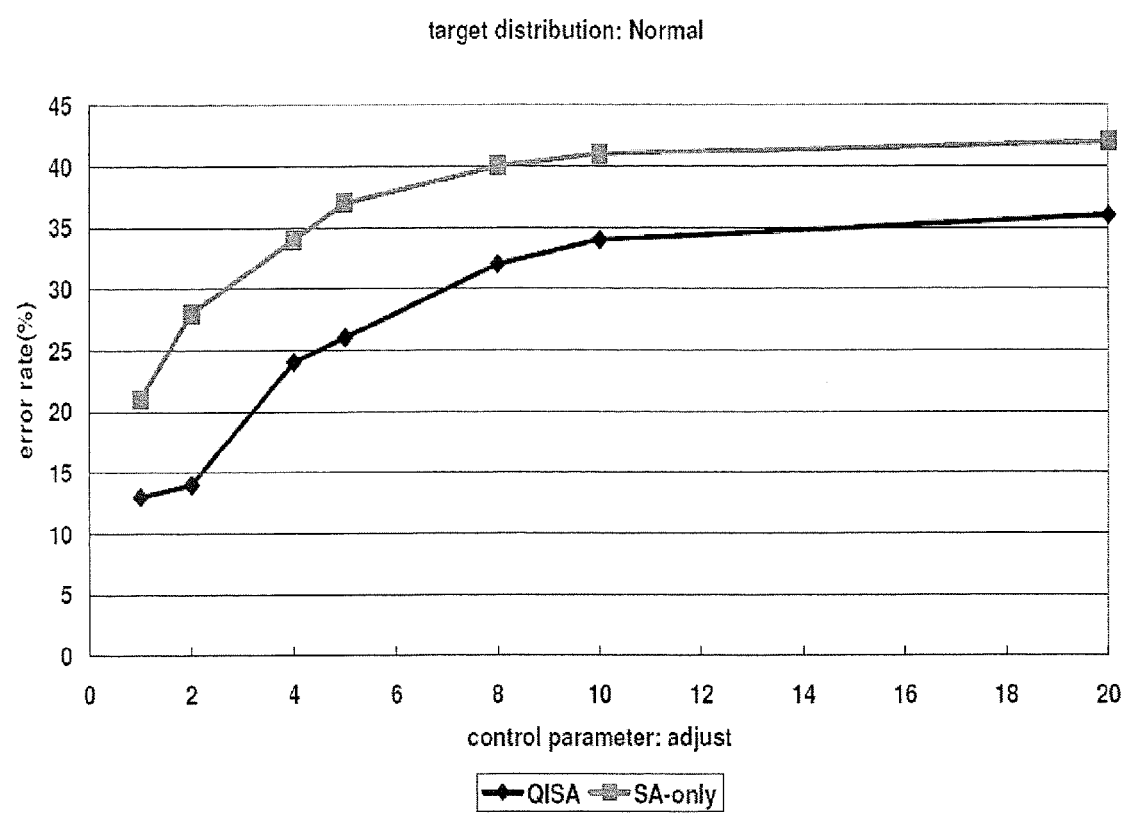
FIG. 12 illustrates graphs that show the dependency of error rate on query range when applying exemplary privacy functions having a normal target distribution to confidential microdata.

The graphs of FIGS. 11 and 12 show the experimental results over this data set. It is observed that SA-only consistently outperforms QI-SA. In fact, the trend of SA-only is similar to the case when there is no correlation between "age" and "capital loss". On the other hand, QI-SA, as expected, performs poorly, since it only considers the sensitive attribute values inside a single group, whose distribution is far different from the overall distribution.

Overall, the above experiments suggest that our optimization algorithms are capable of supporting aggregate query answering with reasonable accuracy while protecting privacy. In particular, SA-only tends to answer aggregate queries more accurately if quasi-identifiers and the sensitive attribute are correlated. Otherwise, QI-SA offers more accurate query answering for smaller query ranges.

B. Impact of Integrating Fake Values

Figure 13:
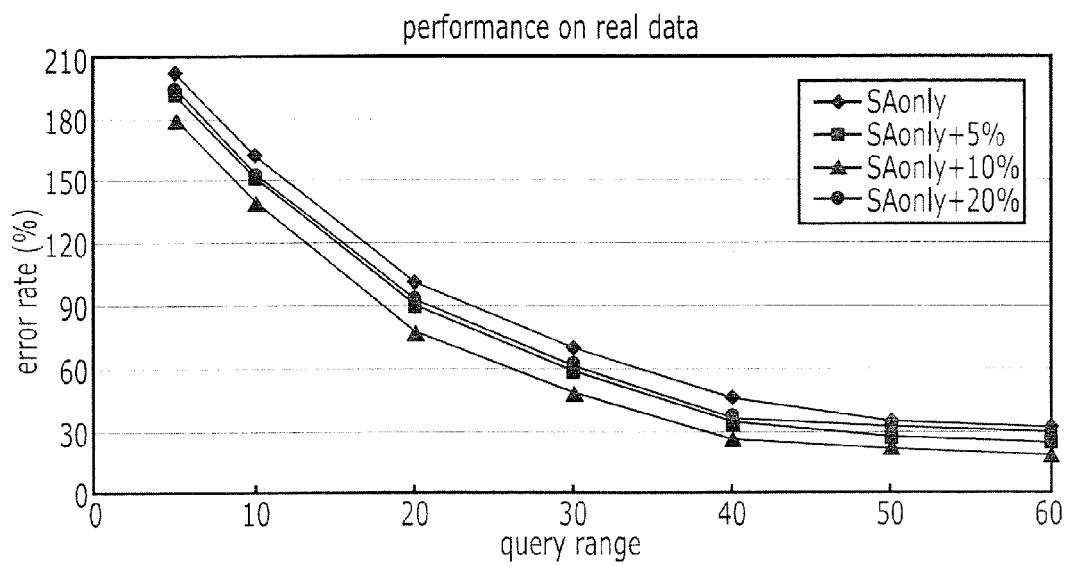
FIG. 13 illustrates graphs that show the dependency of error rate on query range when applying exemplary privacy functions having a normal target distribution to real confidential microdata.
Figure 14:
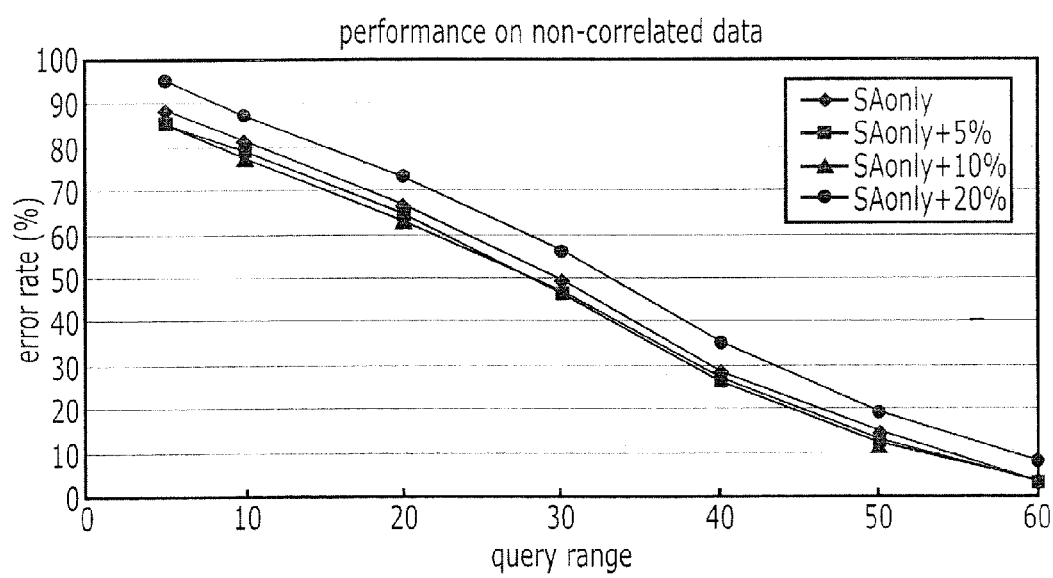
FIG. 14 illustrates graphs that show the dependency of error rate on query range when applying exemplary privacy functions having a normal target distribution to non-correlated confidential microdata.
Figure 15:
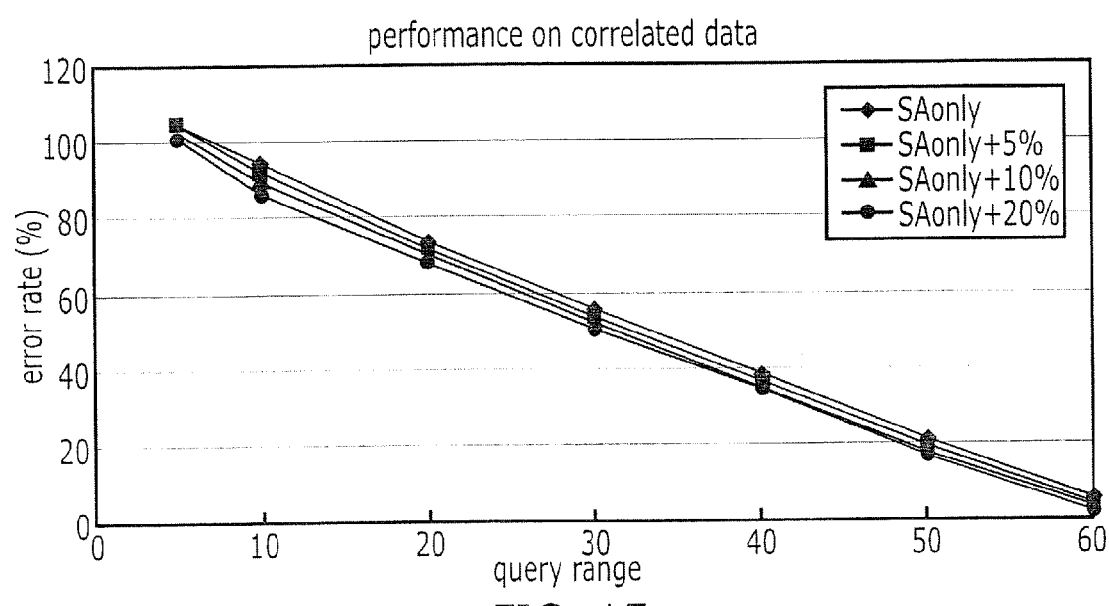
FIG. 15 illustrates graphs that show the dependency of error rate on query range when applying exemplary privacy functions having a normal target distribution to correlated confidential microdata.

The impact of integrating fake values with the QI-SA and SA-only schemes is described below. We first look QI-SA. In each QI partition of size N, we allow up to $K=x\%\cdot N$ fake values. Different number of fake values allowed are denoted "+x %" in the legend. The graphs of FIG. 13 show the impact in the real data set. Referring to FIG. 13, it is observed that adding a few fake tuples helps reduce the error rates effectively. But when adding too many fake tuples (20%), the uncertainty introduced by fake tuples begins to dominate, resulting in worse query accuracy. The graphs of FIG. 14 show the impact in the non-correlated synthetic data. As explained above, SA values in each partition follows the background distribution closely. Thus very few generalizations are needed initially. When adding a few fake tuples (5%), it helps to reduce error rates. Adding more fake tuples reduces query accuracy due the same reason described above. The graphs of FIG. 15 show the impact on the correlated synthetic data. Since there are many generalizations initially in this case, adding fake tuples keeps reducing error rates.

Next we look at the SA-only scheme. To study the impact of adding fake values, we randomly remove 10% of the source data to make its distribution different from the background distribution. When the background distribution is the same as the source distribution, the SA-only scheme is the same as global permutation, and no generalization is involved. Accordingly, adding fake values may have no effect. The graphs of FIG. 12 show the results, from which we have the same observation as from the QI-SA case.

C. Impact of Background Distributions

We investigate the relative errors of QI-SA and SA-only when we have different background distributions and domain generalization hierarchies. As explained above, QI-SA does not perform well when there is a strong correlation between quasi-identifiers and the sensitive attribute. Thus, in this experiment we use a data set in which quasi-identifiers and the sensitive attribute are not correlated.

The first experiment studies the trends when the background distribution is different from the actual distribution. In the synthetic data set of size 10k, the sensitive attribute "capital loss" is generated following a uniform distribution in the range D=[1024, 3072]. The background distribution is set to be a normal distribution. We change the variance of the background distribution by adjusting a parameter r, where the variance of the normal distribution equals range(D)/r. The bigger r, the smaller the variance, and the larger the difference between the background and the actual distributions. We examine the relative errors of range queries whose ranges are set to be 50.

Figure 16:
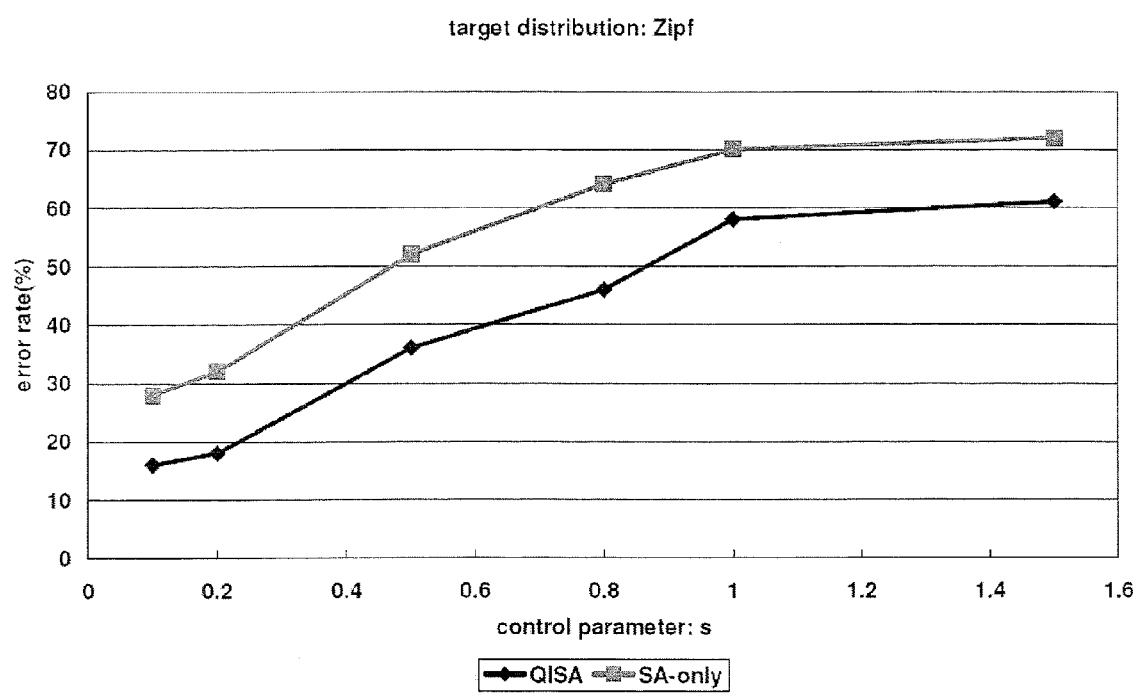
FIG. 16 illustrates graphs that show the exemplary dependency of error rate with a query range set to 50 when applying exemplary privacy functions having a Zipf target distribution to confidential microdata.

Referring to FIG. 16, it is observed that when the background distribution is close to the actual uniform distribution, both algorithms offer better accuracy. As r increases, the error rates also increase. This is expected as more tuples' sensitive attribute values have to be generalized to higher domains to make them follow the background distribution that is far different from the actual distribution.

We also investigate the impact when the sensitive attribute values in the original microdata are skewed. In particular, we set the actual distribution of the sensitive attribute values to be a zipf distribution. All values in the sensitive attribute domain are ordered and assigned a rank correspondingly. Denote the size of the domain as N. For any element with rank k, its probability is set to be $P(k)=k^s/(\Sigma^N_{i=1} i^s)$ where s is a control parameter. The smaller the value s is, the less skewed the data are. In our experiment the control parameter s is set to 0.1. The background distribution is also a zipf distribution, with s set to different values. The results are shown in the graphs of FIG. 16, which illustrates graphs that show the exemplary dependency of error rate with a query range set to 50 when applying exemplary privacy functions having a Zipf target distribution to confidential microdata.

Figure 17:
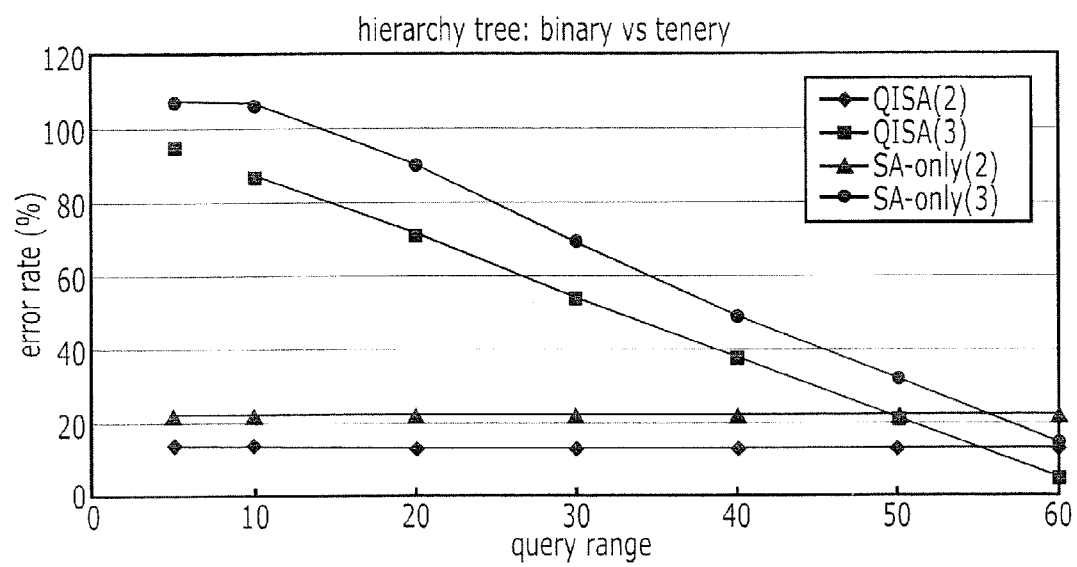
FIG. 17 illustrates graphs that show the dependency of error rate on query range for a binary and tenery hierarchical tree distribution to confidential microdata.

FIG. 17 illustrates graphs that show the dependency of error rate on query range for a binary and tenery hierarchical tree distribution to confidential microdata. Referring to FIG. 17, it is observed that when the background distribution has parameter s=0.1, we have the best accuracy for query answering, as it is the same as the actual distribution. As s increases, the difference between the background distribution and the actual distribution is enlarged, which results in increased relative errors.

Figure 18:
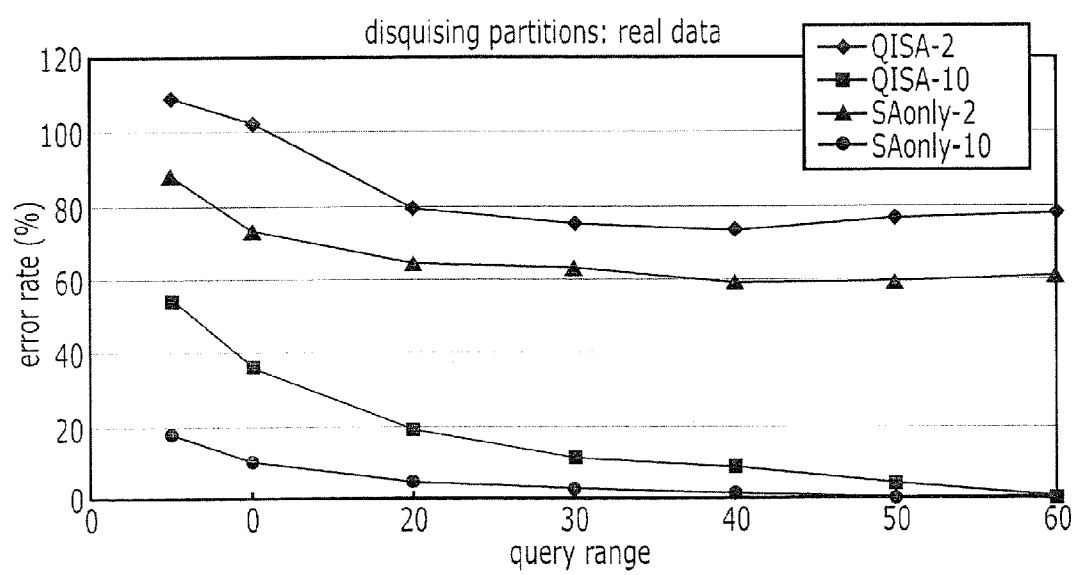
FIG. 18 illustrates graphs that show the dependency of error rate on query range when disguising partitions of confidential microdata.

In accordance with some embodiments, the algorithms do not impose any constraints on the structure of the domain generalization hierarchy. The data owner has complete freedom to design their own domain hierarchy. Although it may not be possible to enumerate all possible hierarchies, there are some general guidelines for choosing domain hierarchies. In the following experiment, we choose a balanced binary tree and a balanced ternary tree as two domain hierarchies. In the legend of FIG. 18, we use (2) and (3) to represent them respectively. In the data set 10k sensitive attribute values are uniformly generated in the range [1024, 3072]. The background distribution is also set to be a uniform distribution for simplicity.

We see that the case with the binary hierarchy results in lower relative errors. This is because it has more subdomains than in the ternary one. Thus statistically we have more choices of smaller subdomains when generating optimal generalizations, introducing less uncertainty to the microdata.

D. Anonymizing Different Parts of Data a feature of some embodiments is that the privacy controller 110 accommodates different background distributions for different parts of the data. The following description studies how such operation affects the quality of ad hoc query answering. We first conduct experiments on the real data set. We study two cases where we partition the data into 2 groups and 10 groups respectively, based on the "age" attribute. In each case, the background distribution of each part is set to be the distribution of the source data in that group. In the legend of FIG. 18, SAonly-k means we partition the table into k groups, and in each group we apply the SA-only algorithm to generalize the sensitive attribute values. QISA-k is interpreted similarly.

Figure 19:
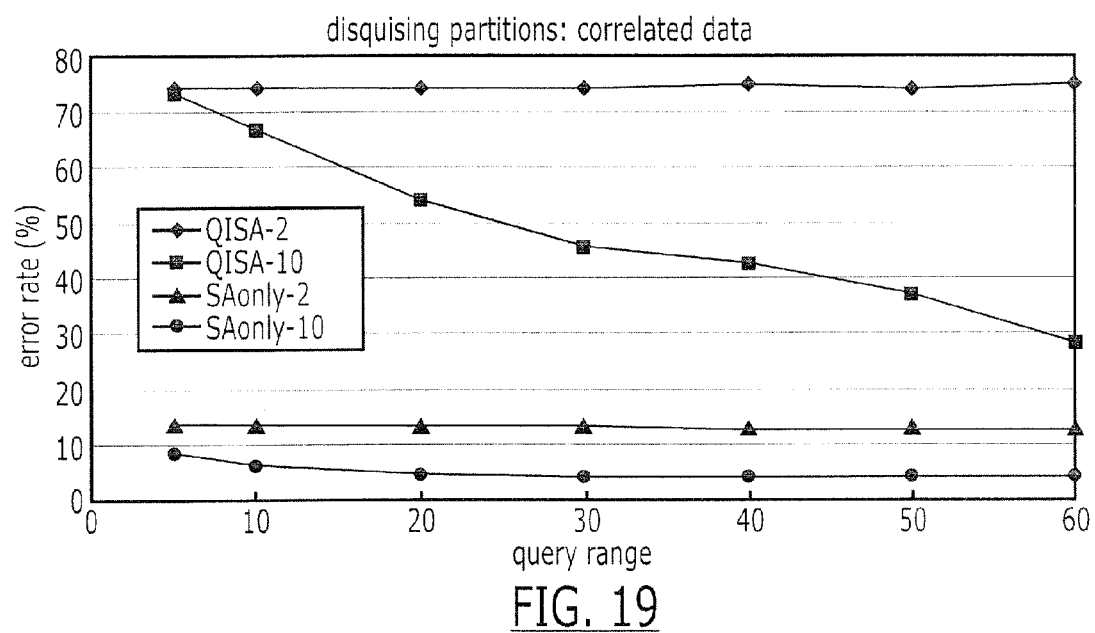
FIG. 19 illustrates graphs that show the dependency of error rate on query range when disguising partitions of correlated confidential microdata.

Referring to FIG. 19, it is observed that the accuracy of both SA-only and QI-SA improves as the number of partitions increases. The reason is that as the number of groups increases, each group has fewer tuples, and the same range query will cover a bigger portion of each group, which leads to better accuracy of query answering.

With continued reference to FIG. 19, we conduct a similar experiment on the correlated synthetic data set described in section VI-A. In this experiment we use a uniform distribution as the background distribution for each group. The range of each corresponding uniform distribution is the actual range of the sensitive attribute values in that group. As for real data sets, we observe that as the number of groups increases, the relative errors of both SA-only and QI-SA decreases. When we have more groups, the ratio of tuples touched by a range query in each group increases. Another reason contributing to this result is the strong correlation between "age" and "capital loss". As we split the data based on "age", the range of sensitive attribute values in each group also becomes smaller. Thus we can use a smaller hierarchy tree for each group. This leads to smaller generalizations, and reduces the error further.

Overall, the above experiments show that by accommodating different background distributions, we can have a finer protection of microdata. Meanwhile, the generalizations produced by QI-SA and SA-only still allow aggregate query answering with reasonable accuracy.

VII. EXEMPLARY OPERATION OF THE PRIVACY CONTROLLER

Figure 20:
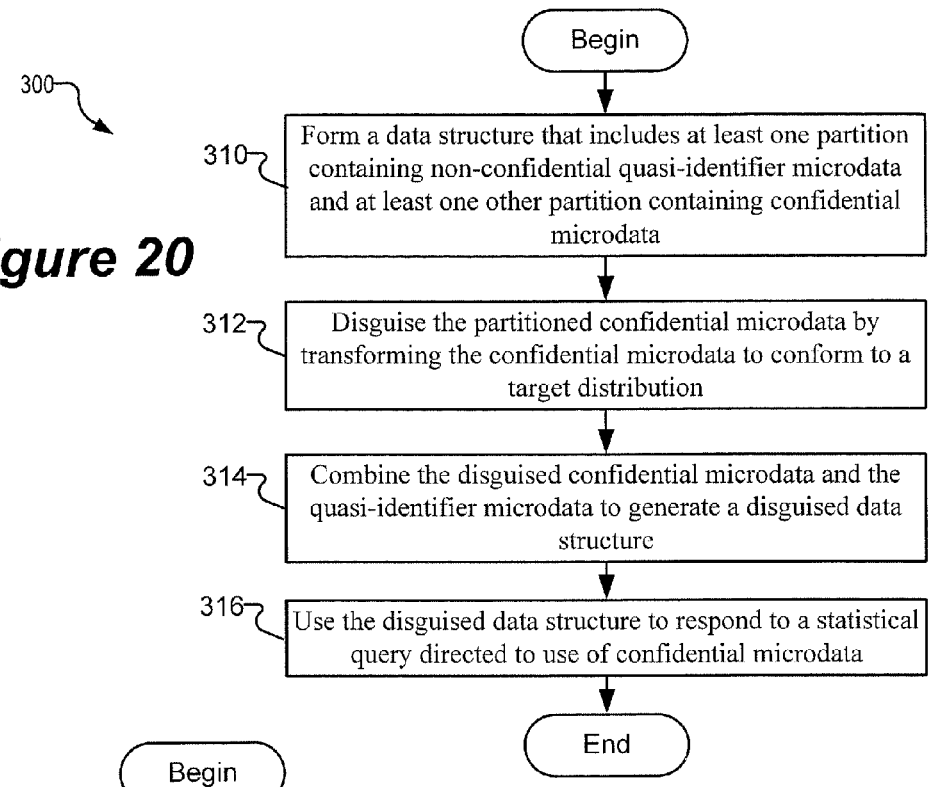
FIG. 20 is a flowchart of an process that may be carried out by the privacy controller to disguise confidential microdata so as to preserve its privacy.

FIG. 20 is a flowchart of an exemplary process 300 that may be carried out by the privacy controller 110 to disguise confidential microdata so as to preserve its privacy. The process shown in FIG. 20 may be performed by executing instructions encoded on a non-transitory computer readable medium included in a computer program product The computer readable program product can include computer readable program code configured to form a data structure that includes at least one partition containing non-confidential quasi-identifier microdata and at least one other partition containing confidential microdata (block 310). Further computer readable program code is configured to disguise the partitioned confidential microdata by transforming the confidential microdata to conform to a target distribution (block 312). Further computer readable program code is configured to combine the disguised confidential microdata and the quasi-identifier microdata to generate a disguised data structure (block 314). Yet further computer readable program code is configured to use the disguised data structure to carry out statistical analysis and to respond to a statistical query which was directed to using confidential microdata, so as to preserve the privacy of the confidential microdata (block 316).

With additional reference to FIG. 2, the privacy controller may therefore include a data structure partitioning module 220, a statistical analysis module 222, and/or a confidential data transformation module 224 within the memory 208 that contain program code which is executed by the processor 206 to carry out at least some of the functionality described herein. In some embodiments, the data structure partitioning module 220 can be configured to carry out at least some of the functionality described herein as associated with block 310 of FIG. 20, the confidential data transformation module 224 can be configured to carry out at least some of the functionality described herein as associated with blocks 312 and 314 of FIG. 20, and the statistical analysis module 222 can be configured to carry out at least some of the functionality described herein as associated with block 316 of FIG. 20.

Figure 21:
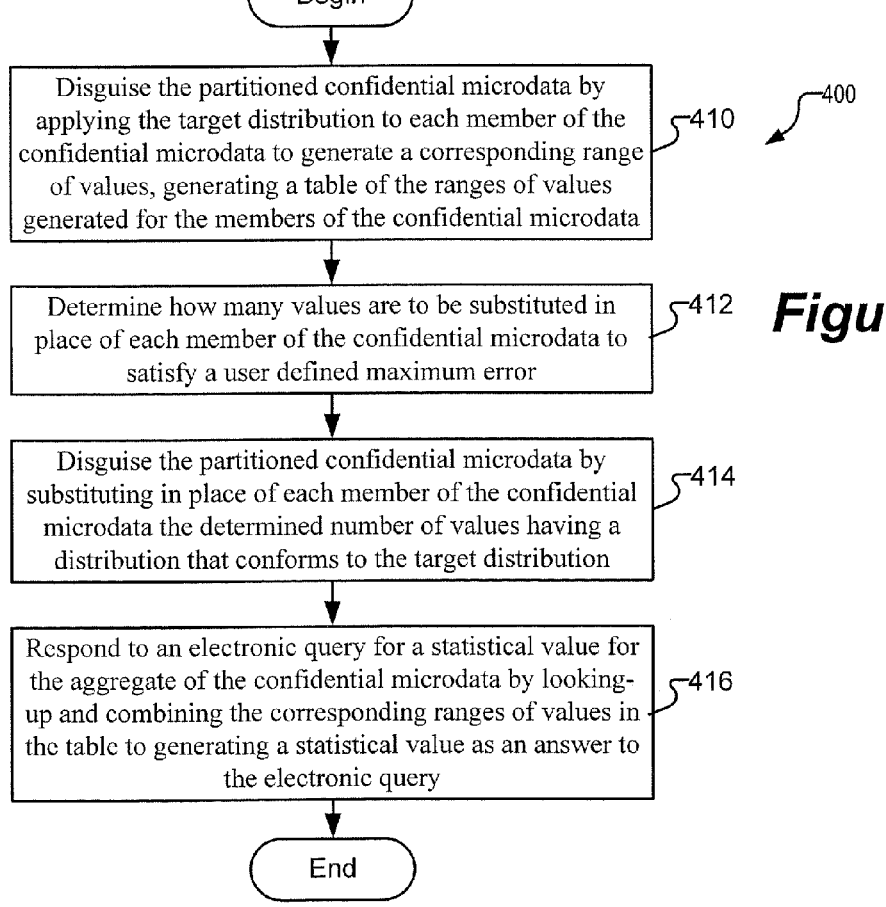
FIG. 21 is a flowchart of a further exemplary process that may be carried out by the privacy controller to disguise confidential microdata according to some further embodiments.

FIG. 21 is a flowchart of a further exemplary process 400 that may be carried out by the privacy controller 110 to disguise confidential microdata according to some further embodiments. The process shown in FIG. 21 may be performed by executing instructions encoded on a non-transitory computer readable medium included in a computer program product. The process 400 is configured to apply the target distribution to each member of the confidential microdata to generate a corresponding range of values, and to generate a table of the ranges of values generated for the members of the confidential microdata (block 410). Further computer readable program code is configured to respond to an electronic query for a statistical value for the aggregate of the confidential microdata by looking-up and combining the corresponding ranges of values in the table to generating a statistical value as an answer to the electronic query.

In some further embodiments, computer readable program code is configured to calculate how many of values are to be substituted in place of each member of the confidential microdata to satisfy a user defined maximum error that can occur between values of the pre-substituted members of the confidential microdata and a median value of the corresponding plurality of values substituted for the members of the confidential microdata (block 412). Further computer readable program code is configured to then disguise the partitioned confidential microdata by substituting in place of each member of the confidential microdata a plurality of values having a distribution that conforms to the target distribution (block 414).

In some further embodiments, the computer readable program code is configured to generate the plurality of values, which are substituted in place of each member of the confidential microdata, to have a median value and a variance that are calculated in response to a distribution of values of the pre-substituted members of the confidential microdata. The computer readable program code may be configured to generate the plurality of values, which are substituted in place of each member of the confidential microdata, to have a uniform distribution with a median value that approximates the corresponding pre-substituted member of the confidential microdata.

In some further embodiments, the computer readable program code is configured to form a binary tree data structure which associates members of the confidential microdata as node values at a base tier, which successively determines for each node at next-higher tiers of the data structure a set of values by multiplying values from a pair of the next-lower tier nodes by weights that are assigned to the inter-tier branches therebetween. A highest one of the tiers forms the plurality of values which are substituted in place of each member of the confidential microdata, and the weights are defined by the target distribution.

The computer readable program code can form the data structure within the database 120, and can respond to an electronic query to the electronic database (e.g., from the computers 130 and/or 140) for a statistical value for an aggregate of the confidential microdata by looking-up and combining the corresponding substituted values of the confidential microdata to generate a statistical value as an answer to the electronic query (block 416).

In some further embodiments, the computer readable program code can relationally associate individual members of the quasi-identifier microdata with individual members of the confidential microdata. The code can form sub-partitions that group members of the confidential microdata that have common associated quasi-identifier microdata, and associate target distributions with each of the sub-partitions, wherein at least two of the sub-partitions are associated with different target distributions. The code may then disguise members of each sub-partition of the confidential microdata by substituting for each member a plurality of values having a distribution that conforms to the target distribution applied to the members of the respective sub-partition.

In some further embodiments, the target distribution associated with a sub-partitioned confidential microdata defines a median value and variance for the values that are to be substituted for members of the sub-partitioned confidential microdata and which are determined from all of the pre-substituted members of the sub-partitioned confidential microdata.

The computer readable program code may disguise the partitioned confidential microdata by inserting at least one fake value as a member of the partitioned confidential microdata to generate disguised confidential microdata. The number of fake values that are inserted may be determined in response to a user defined maximum error that can occur between median values and/or variance for the original confidential microdata and the disguised confidential microdata.

In some further embodiments, the computer readable program code defines relational associations between individual members of the quasi-identifier microdata and individual members of the confidential microdata. The code may form a binary tree data structure extending between a base tier having nodes values of members of the confidential microdata and a highest one of the tiers that forms a plurality of values which are substituted in place of each member of the confidential microdata. The weights may be assigned to the inter-tier branches therebetween which are defined by the target distribution. The code may generate the disguised data structure by eliminating the defined relational associations between some of the individual members of the quasi-identifier microdata and individual members of the confidential microdata to cause a proportional balance between the values of the nodes at each tier of the binary tree data structure that conforms to the target distribution.

In some further embodiments, the computer readable program code configured generates the disguised data structure by shifting certain of the substituted values at each of the nodes as necessary to a median value to provide an equal number of the substituted values on each side of a median value. The code eliminates the defined relational associations between the shifted substituted values of members of the confidential microdata and the quasi-identifier microdata so as to eliminate identification previously provided by the quasi-identifier microdata for the shifted substituted values of members of the confidential microdata.

VIII. CONCLUSION

According to some embodiments, the privacy controller 110 is configured to use a distribution-based privacy model that provides a microdata protection framework that combines sensitive attribute generalization and permutation along with the use of fake values. The privacy controller 110 allows the microdata owner to flexibly accommodate back ground knowledge for different portions of the microdata. In some further embodiments, the privacy controller 110 uses algorithms that produce optimal sensitive attribute generalization to improve the accuracy of ad hoc aggregate queries over the released microdata.

Many variations and modifications can be made to the embodiments without substantially departing from the principles of the present invention. All such variations and modifications are intended to be included herein within the scope of the present invention, as set forth in the following claims.

That which is claimed:

1. A computer program product for disguising data structures, comprising a non-transitory computer readable medium having computer readable program code embodied therein, the computer readable program code comprising:
   computer readable program code configured to form a data structure that includes at least one partition containing non-confidential quasi-identifier microdata and at least one other partition containing confidential microdata;
   computer readable program code configured to disguise the confidential microdata by transforming the confidential microdata to conform to a target distribution;
   computer readable program code configured to combine the confidential microdata that was disguised and the quasi-identifier microdata to generate a disguised data structure;
   computer readable program code configured to disguise the confidential microdata by substituting in place of each member of the confidential microdata a plurality of values having a distribution that conforms to the target distribution; and
   computer readable program code configured to form a binary tree data structure which associates members of the confidential microdata as node values at a base tier, which successively determines for each node at next-higher tiers of the data structure a set of values which includes values from the next-lower tier, and a root node of the binary tree data structure has a weight of one and weights of values of successively next-lower tiers are determined by multiplying a weight of the next-higher tier by a weight of an edge inter-tier branch therebetween divided by a sum of the inter-tier branch weights leading from a particular tier to all of its next-lower tiers, wherein the branch weights associated with the base tier define the target distribution.

2. The computer program product according to claim 1, further comprising:
   computer readable program code configured to apply the target distribution to each member of the confidential microdata to generate a corresponding range of values, and to generate a table of the ranges of values generated for the members of the confidential microdata; and
   computer readable program code configured to respond to an electronic query for a statistical value for an aggregate of the confidential microdata by looking-up and combining the corresponding ranges of values in the table to generate a statistical value as an answer to the electronic query.

3. The computer program product according to claim 1, further comprising:
   computer readable program code configured to generate the plurality of values, which are substituted in place of a plurality of members of the confidential microdata, to have a median value and a variance that are calculated in response to a distribution of values of the members of the confidential microdata.

4. The computer program product according to claim 3, further comprising:
   computer readable program code configured to generate the plurality of values, which are substituted in place of plurality of members of the confidential microdata, to have a uniform distribution with a median value that approximates the corresponding member of the confidential microdata.

5. The computer program product according to claim 1, further comprising:
   computer readable program code configured to calculate how many of the values are to be substituted in place of each member of the confidential microdata to satisfy a user defined maximum error that can occur between values of the members of the confidential microdata and a distribution value of the corresponding plurality of values substituted for the members of the confidential microdata.

6. The computer program product according to claim 1 further comprising:
   computer readable program code configured to form the data structure within an electronic database; and
   computer readable program code configured to respond to an electronic query for a statistical value for an aggregate of the confidential microdata by looking-up and combining the corresponding plurality of values of the confidential microdata to generate a statistical value as an answer to the electronic query.

7. The computer program product according to claim 1 further comprising:
   computer readable program code configured to relationally associate individual members of the quasi-identifier microdata with individual members of the confidential microdata;
   computer readable program code configured to form sub-partitions that group members of the confidential microdata that have common associated quasi-identifier microdata, and configured to associate target distributions with each of the sub-partitions, wherein at least two of the sub-partitions are associated with different target distributions; and
   computer readable program code configured to disguise members of each sub-partition of the confidential microdata by substituting for each member a plurality of values, with the values within the respective sub-partitions being defined to have a distribution that conforms to the target distribution.

8. The computer program product according to claim 7 wherein the target distribution associated with a sub-partition defines a median value and variance for the values that are to be substituted for members of the sub-partition and which are determined from all of the members of the sub-partition.

9. A computer program product for disguising data structures, comprising a non-transitory computer readable medium having computer readable program code embodied therein, the computer readable program code comprising:
   computer readable program code configured to form a data structure that includes at least one partition containing non-confidential quasi-identifier microdata and at least one other partition containing confidential microdata;
   computer readable program code configured to disguise the confidential microdata by transforming the confidential microdata to conform to a target distribution;
   computer readable program code configured to combine the confidential microdata that was disguised and the quasi-identifier microdata to generate a disguised data structure;
   computer readable program code configured to disguise the confidential microdata by inserting at least one fake value as a member of the confidential microdata to generate disguised confidential microdata, wherein a number of fake values that are inserted is determined in response to a user defined maximum error that can occur between a defined distribution for the confidential microdata and the confidential microdata that was disguised;
   computer readable program code configured to define relational associations between individual members of the quasi-identifier microdata and individual members of the confidential microdata;
   computer readable program code configured to form a binary tree data structure extending between a base tier having node values of members of the confidential microdata and a highest one of the tiers that forms a plurality of values which are substituted in place of each member of the confidential microdata, wherein weights are assigned to inter-tier branches therebetween and which are defined so that inter-tier branch weights associated with the base tier have the target distribution; and
   computer readable program code configured to generate the disguised data structure by eliminating the relational associations that were defined between some of the individual members of the quasi-identifier microdata and individual members of the confidential microdata to cause a proportional balance between the values of the nodes at each tier of the binary tree data structure that conforms to the target distribution.

10. The computer program product according to claim 9 further comprising:
   computer readable program code configured to generate the disguised data structure by shifting certain of the values which are substituted at each of the nodes as necessary to a median value to provide an equal number of the values which are substituted on each side of a median value; and
   computer readable program code configured to eliminate the relational associations that were defined between the values of members of the confidential microdata that were shifted and which are substituted and the quasi-identifier microdata so as to eliminate identification previously provided by the quasi-identifier microdata for the values of members of the confidential microdata that were shifted and which are substituted.

11. A computer system comprising:
   a hardware database module that is configured to:
   form a data structure that includes at least one partition containing non-confidential quasi-identifier microdata and at least one other partition containing confidential microdata;
   disguise the confidential microdata by transforming the confidential microdata to conform to a target distribution;
   combine the confidential microdata that was disguised and the quasi-identifier microdata to generate a disguised data structure;

wherein the hardware database module is further configured to disguise the confidential microdata by substituting in place of a plurality of members of the confidential microdata a plurality of values having a distribution that conforms to the target distribution; and wherein the hardware database module is further configured to define a binary tree data structure which associates members of the confidential microdata as node values at a base tier, to successively determine for each node at next-higher tiers of the data structure a set of values which includes values from the next-lower tier, and a root node of the binary tree data structure has a weight of one and weights of values of successively next-lower tiers are determined by multiplying a weight of the next-higher tier by a weight of an edge inter-tier branch therebetween divided by a sum of the inter-tier branch weights leading from a particular tier to all of its next-lower tiers, wherein the branch weights associated with the base tier define the target distribution.

12. The computer system of claim 11, wherein the hardware database module is further configured to:

apply the target distribution to each member of the confidential microdata to generate a corresponding range of values, and to generate a table of the ranges of values generated for the members of the confidential microdata; and respond to an electronic query for a statistical value for an aggregate of the confidential microdata by looking-up and combining the corresponding ranges of values in the table to generate a statistical value as an answer to the electronic query.

13. The computer system of claim 11, wherein the hardware database module is further configured to generate the plurality of values, which are substituted in place of a plurality of members of the confidential microdata, to have a median value and a variance that are calculated in response to a distribution of values of the members of the confidential microdata.

14. The computer system of claim 11, wherein the hardware database module is further configured to respond to an electronic query for a statistical value for an aggregate of the confidential microdata by looking-up and combining the corresponding plurality of values of the confidential microdata to generate a statistical value as an answer to the electronic query.

15. The computer system of claim 11, wherein the hardware database module is further configured to disguise the confidential microdata by inserting at least one fake value as a member of the confidential microdata to generate disguised confidential microdata, wherein a number of fake values that are inserted is determined in response to a user defined maximum error that can occur between a defined distribution for the confidential microdata and the confidential microdata that was disguised.

* * * * *